US010083679B2

(12) United States Patent
Garet

(10) Patent No.: US 10,083,679 B2
(45) Date of Patent: Sep. 25, 2018

(54) DEVICE FOR CONTROLLING AT LEAST ONE AUDIO OR VIDEO SIGNAL WITH THE DISPLAY OF INFORMATION, CORRESPONDING ELECTRONIC MIXING CONTROLLER, METHOD AND COMPUTER PROGRAM PRODUCT

(71) Applicant: Guillemot Corporation S.A., Chantepie (FR)

(72) Inventor: Francois Garet, Vannes (FR)

(73) Assignee: GUILLEMOT CORPORATION S.A., Chantepie (FR)

( * ) Notice: Subject to any disclaimer, the term of this patent is extended or adjusted under 35 U.S.C. 154(b) by 0 days.

(21) Appl. No.: 14/981,382

(22) Filed: Dec. 28, 2015

(65) Prior Publication Data

US 2016/0189699 A1 Jun. 30, 2016

(30) Foreign Application Priority Data

Dec. 31, 2014 (FR) ..................................... 14 63502
Feb. 18, 2015 (FR) ..................................... 15 51344

(51) Int. Cl.
*G06K 9/00* (2006.01)
*G10H 1/32* (2006.01)
(Continued)

(52) U.S. Cl.
CPC ............... *G10H 1/32* (2013.01); *G05G 1/015* (2013.01); *G05G 1/10* (2013.01); *G05G 1/105* (2013.01);
(Continued)

(58) Field of Classification Search
CPC combination set(s) only.
See application file for complete search history.

(56) References Cited

U.S. PATENT DOCUMENTS 5,299,267 A 3/1994 Nakamura
5,450,075 A 9/1995 Waddington
(Continued)

FOREIGN PATENT DOCUMENTS

DE 102007035564 1/2009
DE 102009003253 11/2010
(Continued)

OTHER PUBLICATIONS

Guillemot Corporation, European Search Report dated Jan. 18, 2017, EP Application No. 15202831.2.
(Continued)

*Primary Examiner* — Alex Liew
(74) *Attorney, Agent, or Firm* — Womble Dickinson Bond (US) LLP

(57) ABSTRACT

The invention has for object a device for controlling (2) at least one audio or video signal comprising:

- means for controlling mounted mobile in rotation about an axis of rotation (z) on a base,
- first means of detecting a displacement in rotation of the means for controlling able to generate a first signal, said first signal supplying means for processing said at least one audio or video signal, with the first means of detecting comprising means for measuring the angle of rotation of the means for controlling,
- means for displaying and/or light-emitting means, comprising several sources of light forming at least first and second means of graduation.

According to the invention, said sources of light of said first and second means of graduation are selectively controlled by said means for processing according to the measurement of the angle of the rotation of said means for controlling.

25 Claims, 11 Drawing Sheets

(51) Int. Cl.
*H04H 60/04* (2008.01)
*G05G 1/10* (2006.01)
*G05G 1/015* (2008.04)

(52) U.S. Cl.
CPC ....... *H04H 60/04* (2013.01); *G10H 2210/241* (2013.01); *G10H 2220/066* (2013.01)

(56) References Cited

U.S. PATENT DOCUMENTS

| | | | | |
|---|---|---|---|---|
| 6,438,241 | B1 | 8/2002 | Silfvast et al. | |
| 8,110,734 | B2 | 2/2012 | Flum | |
| 2003/0019734 | A1 | 1/2003 | Sato et al. | |
| 2004/0032395 | A1 | 2/2004 | Goldenberg et al. | |
| 2004/0085863 | A1 | 5/2004 | Yamada et al. | |
| 2006/0000345 | A1 * | 1/2006 | Yoshikawa .......... | G10H 1/0041 84/616 |
| 2008/0212437 | A1 | 9/2008 | Kataoka et al. | |
| 2012/0134513 | A1 * | 5/2012 | Garet ....................... | G05G 1/08 381/119 |
| 2014/0118609 | A1 * | 5/2014 | Jeon ......................... | G02B 7/04 348/345 |

FOREIGN PATENT DOCUMENTS

| | | |
|---|---|---|
| EP | 1391888 | 2/2004 |
| EP | 1394791 | 3/2004 |
| WO | WO-2015008092 | 1/2015 |

OTHER PUBLICATIONS

Pioneer Corporation, "Compact Disc Player CDJ-800MK2 Operating Instructions", sound.vision.soul, 2005.

* cited by examiner

DEVICE FOR CONTROLLING AT LEAST ONE AUDIO OR VIDEO SIGNAL WITH THE DISPLAY OF INFORMATION, CORRESPONDING ELECTRONIC MIXING CONTROLLER, METHOD AND COMPUTER PROGRAM PRODUCT

BACKGROUND

Field of the Invention

Embodiments of the invention relate to memory access. More specifically, embodiments of the invention relate to memory access in a T type memory topology for dual inline memory modules.

The field of the invention is that of electronic music equipment. More precisely, the invention relates to a device for controlling an audio or video signal, and an electronic mixing controller implementing such a control device.

Background

Electronic mixing controllers or consoles are widely used by professional or amateur DJs (abbreviation of disc-jockey) or VJs (abbreviation of video jockey) to select and play pieces of music in discotheques or at an evening party, and to interact with these pieces of music (and where applicable with a visual accompaniment, such as images, videos, or visual effects), in particular to accelerate, slow down and/or repeat a portion (these processing operations are called "mixing").

These electronic mixing controllers or consoles are an alternative or a complement to vinyl turntables (or record players). They can furthermore be used to mix audio-video clips or to synchronize music with video (or vice versa).

There are relatively compact mixing consoles which can be easily transported. Some of them can be connected to a data-processing apparatus, a laptop computer, for example, on which a mixing software program is implemented, for example, the "Virtual DJ" (registered mark) software from the firm Atomix Productions which is capable of mixing audio and video tracks. With this software, it is possible to perform scratching with the video in the same way as with audio only, i.e. with the same impact on the sound track of the video clip as if a soundtrack having no visual accompaniment were to be mixed.

Conventionally, a mixing console comprises a control surface on which there are means for controlling, such as, for example, rotary buttons, push buttons, faders, used for setting the audio signals (in terms of equalization, volume, balance, gain, etc.).

One or more jog wheels or jog dials are also provided. A jog wheel of this kind enables the user to move within musical libraries or within a piece of music, or else accelerate or slow down the playback of a piece of music.

During the playback of a piece of music, a pressure exerted by a user on the jog wheel enables the creation of sound effects known as a "scratch" sounds, as when a DJ places his hand on a vinyl microgroove record when it is being played on a record player (thus interrupting its rotation), and moves the record forward and backward. A portion of the music is then played forward and backward with the hand (the vinyl record rotates at the speed of the hand instead of rotating at the speed of the turntable of the record player) which produces specific sounds.

There are different types of scratch. As such, it is important to note that the gestures of the hand during the scratch correspond to relatively rapid actions, therefore to a relatively rapid rotation of the jog wheel.

The computer has imposed itself in the DJing environment in the same way as the CD player or the vinyl record player.

However, using a computer in parallel with a mixing console required for the DJ to often look at the screen of the computer instead of looking at the audience or his hands during the settings. In particular, the DJ is constrained to regularly look at the screen of the computer to read at what speed a piece of music is being played, how much time remains before the end of a piece of music, or, when he is performing a scratch, to retrieve the position of the beginning of the scratch. Using a computer therefore has the disadvantage of seizing the attention of the DJ. Furthermore, the display on the screen of the computer comprises a latency. In particular, the position of the jog wheel displayed on the screen of the computer differs with respect to the actual position of the jog wheel actuated by the DJ. Between the moment when the DJ displaces the jog wheel and the moment when the screen displays the displacement that the DJ sees on his mixing console, there is a difference that is visually noticeable and which can disturb the DJ (i.e. have him miss the position that he wants to reach). Indeed, currently, the latency is from five to ten milliseconds. Consequently, for rapid and precise actions such as performing a scratch, the DJ cannot rely on what is displayed on the screen of the computer.

Moreover, it is desirable that the mixing console should detect such scratching on the part of the user, i.e. the action of the hand or fingers of the user on the jog wheel and display the corresponding information.

Some Pioneer CD players (registered trademark) and Pioneer mixing controllers have either a circular screen built into the player or the mixing controller, or a chase (i.e. a lighted crown of LEDs ("Light-Emitting Diode") whereon luminous points (or a LED) indicate the angular displacement of the plate of the jog wheel.

The implementing of a lighted crown (of LEDs in particular) or of a circular screen however has several disadvantages.

The size of the chase or of the screen limits the precision of the angular information. By way of example, a chase that comprises 36 LEDs, displays one LED every ten degrees in order to represent a displacement over 360 degrees. Such a chase therefore does not make it possible to display an angular displacement to the nearest 5 degrees. Even so, displaying an angular displacement to the nearest 5 degrees would offer precision that is much less than that offered by a point of Tipp-Ex (registered trademark) placed on a vinyl record by a DJ in order to allow him to get his bearings when he is performing a scratch on a record player. Furthermore, the resolution of the screen limits the precision of the visual information.

Moreover, the size of the chase or of the screen built into the mixing console limits the readability of the information.

Indeed, even if a high-definition screen is available, or a chase comprising 72 LEDs, if the screen or the chase is not large, a reduced angular displacement can hardly be discerned for the user. The precision depends on the number of LEDs or on the resolution of the screen. However, if the screen is of reduced size (for example, when it is built into a jog wheel of a mixing console), it is difficult to indicate the angular position with a precision that exceeds 5 degrees, because the user would have to be able to identify the separations of the circle in $1/72$, which requires a trained eye; all the more so as the angular displacements represented on the screen or the LEDs are rapid and that a mixing console is used in a difficult visual environment (dark room with plays of lights).

Finally, the display is not practical. It is possible to change the resolution of the angular displacement on the chase or on the screen in order to render a minimal displacement more readable, for example by multiplying the angular displacement of the plate on the display by four. As such, when the user displaces the plate 10°, he moves his representation on the screen or on the chase by 40°. The screen then gives information that is more precise but not very practical, since the user cannot get his bearings on the screen in order to aim for a position (indeed, the angular displacement displayed on the screen no longer corresponds to the angular displacement of the plate).

Moreover, currently, the measurement of the angular displacement of the jog wheel is carried out using optical discs or wheels. The jog wheels of DJ products generally use optical encoders (more or less precise).

The main limitation with this type of technology is the resolution. Indeed, the higher the number of steps per revolution is, the more the costs increase. This can be explained by the fact that it is necessary to either:

- use finely laser-cut circular metal discs in order to have very fine steps of rotation (counting of the teeth);
- use discs made of transparent polymers with fine printed lines in order to obtain a precise counting (large number of lines);
- use a reduction ratio in order to increase the precision of the counting of a less-precise encoder.

In any case, this requires the adding of additional mechanical parts or the use of expensive parts (discs).

Currently, in order to be able to simulate the scratch mode of a vinyl turntable, a portion of the jog wheel is pushed in mechanically under the weight of the hand of the user. The detection of the pushing-in movement of the jog wheel is either mechanical (with the pressure making it possible to actuate a sensor), or optical (through an infrared emitter and receiver, for example). The pushing in of the plate of the jog wheel provides a sensation close to the microgroove record turntables, where the weight of the hand pushes in the thickness of the felt placed between the vinyl record and the plate, which immobilizes the microgroove record.

The Pioneer CDJ CD players operate on this principle. The plate is pushed in over a course of travel less than 1 mm under the weight of the hand, with a lever multiplying the movement caused by the pushing in of the plate in order to displace a tab bearing white and black streaks. An optical sensor captures this displacement of the streaks and as such informs the microcontroller of the pushing in of the plate. This technique makes the jog wheels mechanically more complex (and therefore expensive) than a weight or capacitive detection.

The display tends to become complex for the user and the information is supplied in a manner that is not very natural.

In other terms, the existing mixing consoles do not provide full satisfaction, and there exists therefore a need for a mixing console that minimizes or cancels out the disadvantages of the devices of prior art.

BRIEF DESCRIPTION OF THE DRAWINGS

Other characteristics and advantages of the invention shall appear more clearly when reading the following description of preferred embodiments, provided for the purposes of information and not restrictive, and the annexed drawings, among which.

SUMMARY

Figure 1:
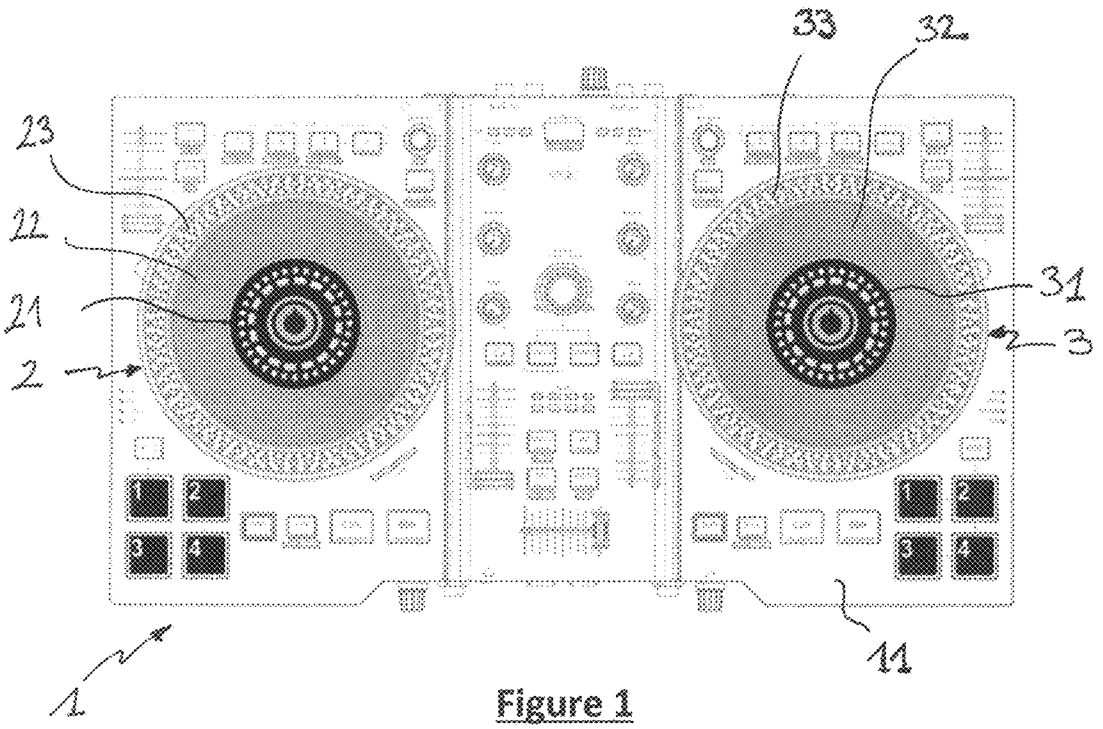
FIG. 1 is a top view of an electronic mixing console implementing two control devices in accordance with the invention.

The control device proposed does not have these disadvantages of prior art.

Indeed, a device is proposed for controlling at least one audio or video signal comprising:

- means for controlling mounted mobile in rotation about an axis of rotation on a base,
- first means of detecting a displacement in rotation of the means for controlling able to generate a first signal, said first signal supplying means for processing said at least one audio or video signal, with the first means of detecting comprising means for measuring the angle of rotation of the means for controlling,
- means for displaying and/or light-emitting means, comprising several sources of light forming at least first and second means of graduation.

According to the invention, said sources of light of said first and second means of graduation are selectively controlled by said means for processing according to the measurement of the angle of the rotation of said means for controlling.

The control device of the invention has the form of a jog wheel mobile in rotation which controls in particular the playback of a CD, of a DVD, of an MP3 player or of a computer.

This jog wheel is furthermore possibly mobile in translation. In this case, all or a portion of the jog wheel can be pushed in by a user (by application of a pressure of the hand, preferably by the simple weight of the DJs hand or fingers, i.e. without the DJ having to exert force in order to push it in) to generate a sound effect and return to neutral position as soon as the pressure is released.

The jog wheel implements means for displaying and/or light-emitting means visible, for example, through a surface of the jog wheel, such as the central portion of the jog wheel.

The jog wheel in accordance with the invention supplies, in at least one method of use, angular information on several graduations, at the center of the jog wheel for example.

The display of each jog wheel uses, for example, two concentric circles (or crowns) of lighting in order to provide angular position information that is more precise than a single circle (or crown). The two concentric circles of lighting indicate the angle of displacement of the rotating plate of the jog wheel at the center of which these two circles of lighting are found, with the combination of these two circles giving more precision than a single circle of lighting.

In other terms, the light-emitting means and/or these means for displaying form a fixed display zone at the center of the jog wheel comprising, for example, at least two concentric circles of lighted elements that can be controlled selectively (lit, for example) according to the angle of rotation of the jog wheel with respect to a fixed base.

In another method of use, it simultaneously provides information on the playback speed and position in the piece of music. Needing to look at the screen of the computer less, the DJ gains in concentration, rapidity and in synchronization, and pays more attention to his music and to his audience.

Several methods of use of the jog wheel are as such possible. The jog wheel is in particular used to navigate/move (to move forwards/backwards) inside a piece of music, in order to accelerate or slow down the music or to produce sound effects such as "scratch" sounds.

The jog wheel in accordance with the invention comprises:

- a first crown formed by a circular screen, or a chase (i.e. a crown of LEDs) of which the displacement indicates, for example, the angular displacement of the rotating plate of the jog wheel;
- a second crown that indicates, for example, a playback position inside a piece of music.

The implementing of such a display in the jog wheels makes it possible to have a device that is visually impressive to create a show when the DJ is mixing in public.

This furthermore makes it possible to "scratch" easily (i.e. to easily carry out a scratch). When the DJ carries out a scratch on a record player with a vinyl record, the DJ places marks (points of Tipp-Ex (registered trademark), for example) on the vinyl which allows him to get his bearings. He therefore does not have to raise his head from the vinyl in order to look at his hand and the point that he has to reach on the vinyl. When the DJ performs a scratch on a standard jog wheel of a mixing console, this manipulation is difficult due to the fact that the DJ must at the same time look at his hand to see how he is displacing the jog wheel, and the screen of the computer to see where his cursor is positioned.

With a display at the center of the jog wheel in accordance with the invention, the DJ who is carrying out a scratch embraces with the same glance his hand and locates it on the central lighting, which allows him to perform his scratch with great precision.

Each one of the concentric circles can be comprised of points, of straight portions and/or of curved portions (of varied sizes) that can be lit which are spaced and arranged in a circle.

These points and portions that can be lit form means of graduation on at least two levels (note in fact that more than two graduations, such as two lighted concentric circles, can be provided). The sources of light are, for example, selectively lit or turned off according to the measurement of the angle of rotation of the means for controlling. Alternatively, the light intensity or the color of the sources of light can vary according to the measurement of the angle of rotation of the means for controlling.

In at least one method of use of the device in accordance with the invention, the means of graduation display the extent of the displacement in rotation of the means for controlling from the origin (or point of departure) of the displacement to the current position, in such a way as to assist the DJ in returning with precision to the point of origin of the scratch, if he so desires.

The circles of LEDs could be used to display with precision information other than the displacement in rotation, for example for the display of the position of a virtual playback head in the duration of a piece of audio/video.

The intensity of the stream of light of the means of graduation can be adjusted by the user or automatically.

Preferably, the display corresponding to the displacement in rotation of the means for controlling (and therefore of the hand or of the finger of the user who actuates them) is implemented on the circle that is the closest to the hand of the user. The display corresponding to a multiple of the displacement of the means for controlling is implemented on a circle farther away from the hand of the user.

In a particular embodiment, the display corresponding to the displacement in rotation of the means for controlling is implemented on the circle of larger diameter.

A fixed visual marking can be provided that indicates the "noon" direction and therefore one or several "noon" positions (position equivalent to the graduation corresponding to 12h00 on the dial of a watch with hands). This visual marking can be backlit.

According to a particular aspect of the invention, the first means of graduation comprise first levels able to indicate the angle of rotation of the means for controlling according to a first level of precision, the second means of graduation comprising second levels able to indicate the angle of rotation of the means for controlling according to a second level of precision.

According to a particular aspect of the invention, none of said first and second levels is located at a position equivalent to the "noon" position on the dial of a watch with hands.

According to a particular aspect of the invention, the first levels are arranged in such a way that they substantially form the vertices of a first polygon that can be inscribed in a first circle, and the second levels are arranged in such a way that they substantially form the vertices of a second polygon that can be inscribed in a second circle.

According to a particular aspect of the invention, said first and second means of graduation are arranged in at least two concentric circles.

According to a particular aspect of the invention, said first and second means of graduation are able to indicate the extent of the displacement in rotation of the means for controlling from the origin (or point of departure) of the displacement to the current position.

According to a particular aspect of the invention, said sources of light are visible through a surface of said means for controlling.

According to a particular aspect of the invention, the number of levels constituting each one of said first and second means of graduation is according to the number of steps per revolution of the means for controlling.

According to a particular aspect of the invention, the product of the number of levels of the first level of graduation by the number of levels of the second level of graduation is equal to the number of steps per revolution, or to a multiple of the number of steps per revolution, of the means for controlling.

According to a particular aspect of the invention, the device comprises second means for detecting a press on the means for controlling, along an axis substantially parallel to the axis of rotation, able to deliver a second signal, said second signal supplying the means for processing said at least one audio or video signal.

According to a particular aspect of the invention, the first means for detecting a displacement in rotation are optical means for detecting.

According to a particular aspect of the invention, the first means for detecting a displacement in rotation are Hall effect detection means.

According to a particular aspect of the invention, the second means for detecting a press on the means for controlling comprise capacitive means for detecting, Hall effect detection means, or at least one pressure sensor.

According to a particular aspect of the invention, the means for controlling comprise a circular plate made from a transparent material and a ring, said means for displaying and/or the light-emitting means being visible through said at least one central portion of said plate.

According to a particular aspect of the invention, said means for displaying and/or the light-emitting means are mounted fixedly on the base.

According to a particular aspect of the invention, the means for displaying are comprised of at least one LCD or VFD.

According to a particular aspect of the invention, said at least one LCD or VFD has the shape of one or more crowns or of a disc.

According to a particular aspect of the invention, the light-emitting means comprise LEDs.

According to a particular aspect of the invention, the LEDs are of the monochromatic type or of the RGB type.

According to a particular aspect of the invention, the sources of light form third means of graduation and are selectively controlled by the means for processing according to the playback speed of said at least one audio or video signal.

According to a particular aspect of the invention, the sources of light form fourth means of graduation and are selectively controlled by the means for processing in order to indicate a playback position of said audio or video signal.

According to a particular aspect of the invention, the sources of light of at least one of said means of graduation are selectively controlled to indicate a scratch starting position and a current scratch position.

In devices from prior art, during a scratch, the light is displaced in order to display only the current position (the origin is therefore not displayed). Consequently, the DJ has to remember the origin of his scratch movement, which is not very practical. According to this particular aspect of the invention, the sources of light (LEDs) are lit from the point of departure of the scratch to the current position.

According to a particular aspect of the invention, the means of graduation are substantially coaxial with the means for controlling.

The invention also relates to an electronic mixing controller of at least one audio signal and/or of at least one video signal comprising at least one control device such as described hereinabove.

The mixing controller in accordance with the invention comprises at least one jog wheel.

This can be a two-deck mixing controller, i.e. a controller with two wheels or jog wheels that control the playback of two different pieces of music.

The invention, moreover, relates to a method for controlling at least one audio or video signal implemented in such an electronic mixing controller. Said at least one control device comprises means for controlling mounted mobile in rotation about an axis of rotation on a base, and means for displaying and/or light-emitting means, comprising several sources of light forming at least first and second means of graduation, said method comprising a step for detecting a displacement in rotation of the means for controlling by first means for detecting a displacement in rotation able to generate a first signal, said first signal supplying means for processing said at least one audio or video signal, with the first means of detecting comprising means for measuring the angle of rotation of the means for controlling.

According to the invention, the method further comprises a step for the selective control of said sources of light of said first and second means of graduation by said means for processing according to the measurement of the angle of the rotation of said means for controlling.

The invention, furthermore, relates to a computer program product that can be downloaded from a communications network and/or stored on a support that can be read by a computer and/or executed by a microprocessor, with the computer program product comprising program code instructions for the execution of the method for controlling at least one audio or video signal, when it is executed on a computer.

DETAILED DESCRIPTION

The invention shall be described in the framework of a portable mixing controller or console. This console is, for example, connected to a laptop computer (not shown) on which a mixing software program is implemented. It is possible to connect to the console, speakers, a microphone and a headset.

Structure of the Mixing Console (or of the Controller)

Such a mixing console 1 is shown in FIG. 1 and comprises a case (or frame) which has a control surface 11 comprising two circular jog wheels 2, 3 forming means for controlling.

In this FIG. 1, only the upper plate 22, 32 and the ring (or crown) 23, 33 of the jog wheels 2, 3 respectively can be seen. The ring and the plate of each jog wheel form first means for controlling an audio or video signal. The ring 23, 33 whereon is arranged a relief is preferably manufactured from an anti-slip material in such a way as to further optimise its manipulation.

Second means for controlling, such as for example rotary buttons, push buttons, faders, for setting the audio (in terms of equalization, volume, balance, gain), the setting of the microphone input and the headset output in particular, are arranged on the control surface 11.

Figure 3A:
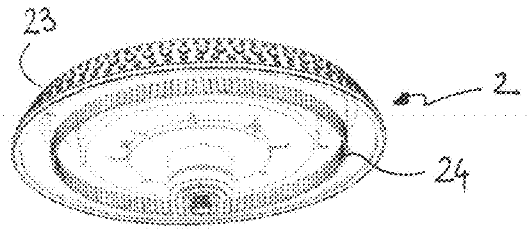
FIGS. 3A and 3B are perspective views of a control device according to a first embodiment of the invention.
Figure 3B:
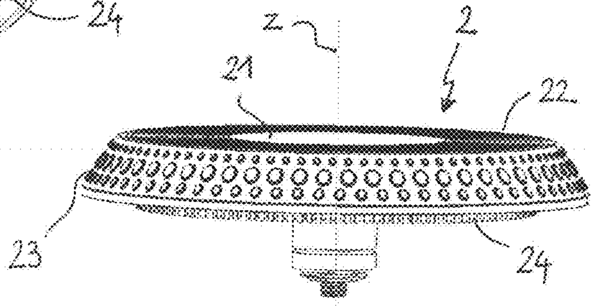
Figure 3C:
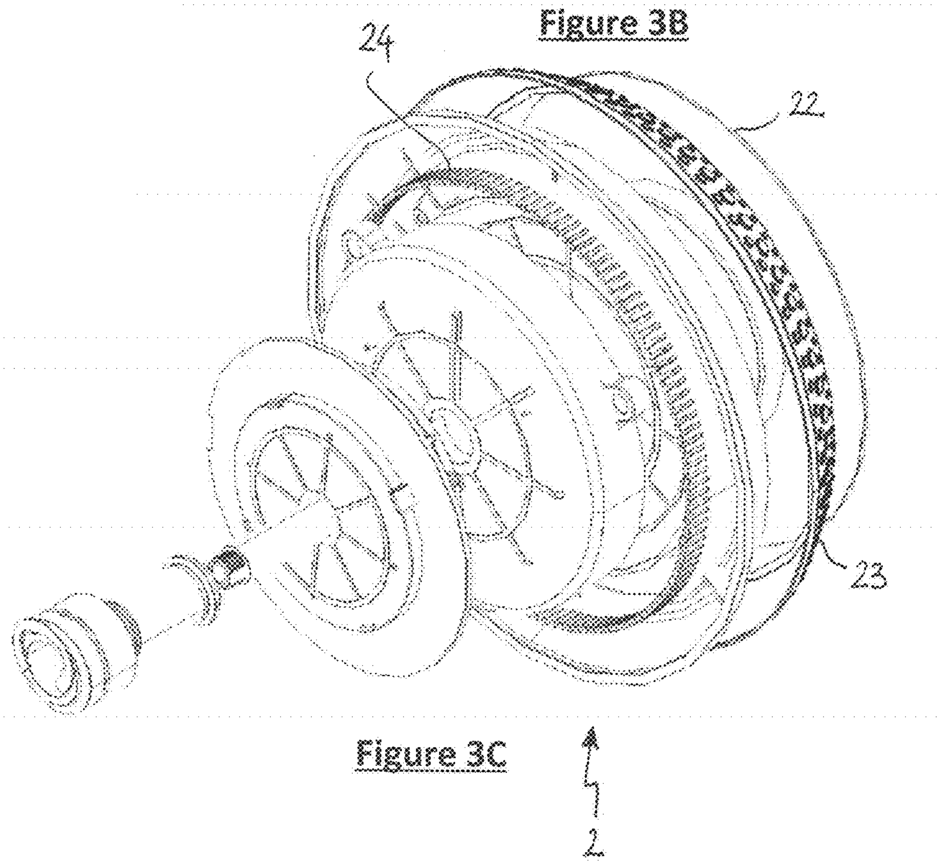
FIGS. 3C, 3D and 3F are exploded views of the control device of FIGS. 3A and 3B.

During the playback of a piece of music (i.e. of an audio track) by the laptop computer, various actions of the user on the jog wheel 2, for example, and more precisely on its upper plate 22 and/or on its ring 23 make it possible to control the mixing software. As such:

- a rotation of the jog wheel 2 (by an action of the hand of the user on the ring 23) without pressure on the plate 22 controls the displacements within the piece of music;
- a rotation of the jog wheel 2 about the axis z (which is substantially perpendicular to the plane of the surface of the plate 22 as shown in FIG. 3B) with pressure on the plate 22 controls a "scratch" effect. This pressure of the hand or of the fingers of the user on the plate 22 provokes the pushing in of the jog wheel 2, and more precisely of the plate 22 and of the ring 23, along the axis z over a course of travel of about 0.5 mm. Of course, the course of translation of the jog wheel 2 can be less than or greater than this value. A press on the plate 22 can however be detected without a translation of the plate of the jog wheel being implemented. Any press on the plate 22 or action on the plate 22 directed at least partially according to the axis z (the weight of the hand of the user for example) on the jog wheel 2 is detected by means for detecting which shall be described in more detail in what follows.

Note that when no rotation and no pressure are applied on the jog wheel 2, the playback of the piece of music is carried out entirely normally.

Figure 2:
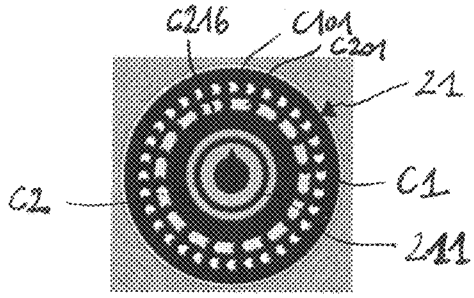
FIG. 2 is a detailed view of the display device of one of the two control devices of the mixing console of FIG. 1.

FIG. 2 is a detailed view of the jog wheel 2 of the mixing console 1 of FIG. 1 (with the other jog wheel 3 being of identical structure). The jog wheel 2 comprises a digital display device, or screen, 21 which is fixed (i.e. which does not rotate when the jog wheel 2 is driven in rotation.

The jog wheels 2, 3 can comprise an optical filter that extends above the display device 21, with this optical filter being, for example, a band-pass filter that allows, for example, red light to pass and substantially attenuates light having different wavelengths. In this way, the quantity of the light reflected back through the filter is reduced, which improves the readability of the display.

The display device 21 comprises two concentric circles C1, C2 of LEDs (an inner circle C2 of radius r and an outer circle C1 of radius R) arranged around a drawing 211 (a logo for example) located at the centre of the jog wheel 2.

Above the LEDs is a transparent plate, fixed with respect to the case, whereon is painted or glued a lighting pattern of the LEDs. This lighting pattern comprises free zones i.e. which allow the light to pass (to each LED is associated a free zone of the lighting pattern, but the lighting pattern can comprise additional free zones) and opaque zones which give their form to the lights. Between this transparent plate and the printed circuit of the LEDs, a guide for the lights fixed on this printed circuit can be placed. The lighting pattern can consist of one or several opacifying filters.

On the lighting pattern, around certain free zones, borders can be carried out at regular intervals. In this case, preferably, one light out of two comprises such a border. This border makes it possible to identify and to more easily memorize a light of a circle (and, consequently, retrieve a position in an audio or video track).

The circular display in the jog wheels 2, 3 of the mixing console (control device) 1 replaces the information (playback speed of a piece of music, time remaining before the end of a piece, position of the beginning of the scratch, etc.) before the eyes of the DJ, in playback mode as well as in scratch mode, and prevents the latter from having to multiply glances on the computer.

In the jog wheel 2 shown partially in FIG. 2, the outer circle C1, located at the periphery of the display device, comprises 32 LEDs, and the inner circle C2 comprises 16 LEDs. The number of LEDs for each one of these circles C1, C2 can be different. As such, for example, the outer circle C1 can be comprised of 24 LEDs and inner circle C2 of 12 LEDs. The outer circle C1 is substantially at the same height as the inner circle C2. However, the circles of LEDs could be staged at different heights (i.e. arranged as in tiers). In particular, the inner circle C2 can be arranged retracted in the jog wheel 2 (at a height less than that of the outer circle C1) in order to improve the contrast ratio of the inner circle C2 (therefore the readability of the display).

Figure 8:
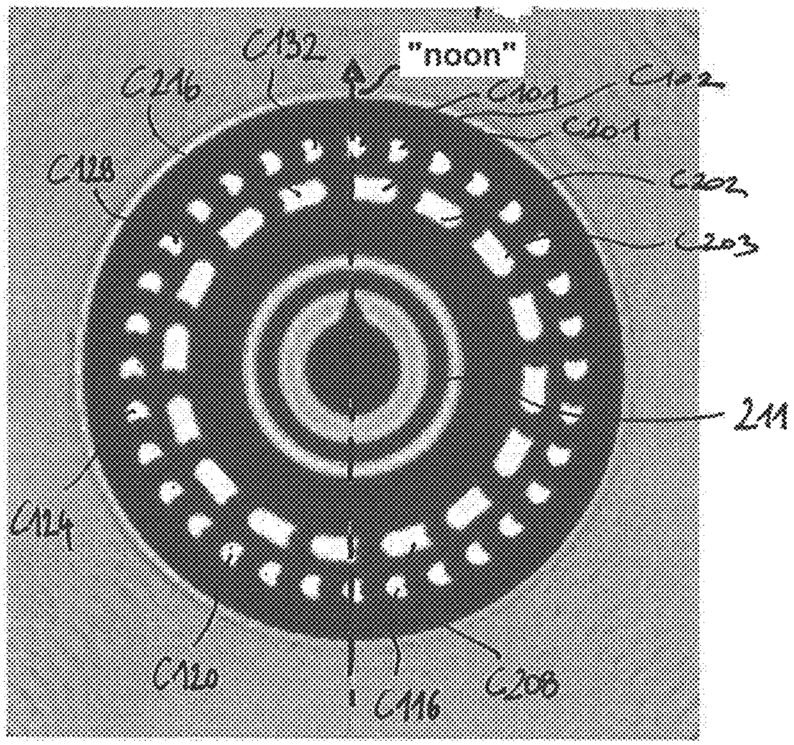
FIG. 8 is an enlarged view of the display device of FIG. 2.

In the jog wheel 2 shown partially in FIGS. 2 and 8, one of the LEDs of the outer circle C1 (the LED numbered C101) is aligned with the position of a "noon" graduation (12h00) and one end of one of the LEDs (the LED C201) of the circle C2 is aligned with the position of a "noon" graduation.

Figure 9:
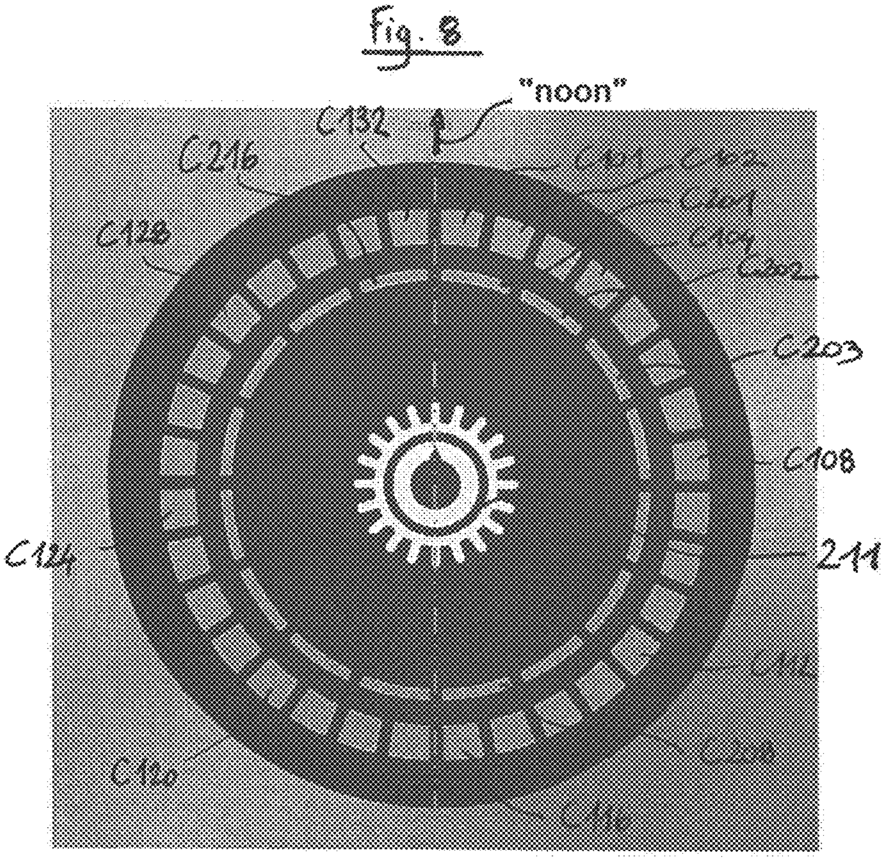
FIG. 9 is a detailed view of an alternative of the display device of FIG. 2.

However, this can be different because the lights of the circles of LEDs may advantageously not be aligned with the "noon" direction. As shown in FIG. 9, the circle C1 of LEDs has an angular offset with respect to the position that a "noon" graduation would have in such a way that none of the LEDs of C1 is in "noon" position (12h00). The circle C2 of LEDs has an angular offset with respect to the position that a "noon" graduation would have (offset identical to that of the circle C1) in such a way that C2 does not comprise any LEDs at the "noon" position (12h00). In this way, visually when a first LED is activated (i.e. when a LED changes state, in particular when this LED is lit, or goes out, or changes color, or changes light intensity) on C1 or C2, this activation shows the direction of the rotation of the jog wheel.

In the case where a rotation sensor comprising 768 steps per revolution is implemented, the result of the product of the number of LEDs of the outer circle C1 by the number of LEDs of inner circle C2 corresponds more preferably to 768 (or to a multiple of 768). For example, the number of LEDs of the outer circle C1 can be equal to 32 and the number of LEDs of the inner circle C2 can be equal to 24 (with the product of 32 by 24 being equal to 768).

The LEDs can be LEDs of the monochromatic or RGB (for "Red Green Blue") type.

The circles of LEDs can be replaced with an LCD screen (for "Liquid Crystal Display") or a VFD screen (for "Vacuum Fluorescent Display") able to display lighted clusters arranged in circles.

Independently or as a complement to this particular display, the mixing console 1 can implement means for detecting the angular displacement of each jog wheel 2, 3 and/or means for detecting a press on each jog wheel 2, 3 of which several embodiments are described hereinafter.

According to a first embodiment, described in relation with FIGS. 3A to 3F, the rotation of the means for controlling 22, 23 the jog wheel 2 is detected by an optical system, and more precisely an optical encoder comprising a toothed encoding wheel 24 mobile in rotation about the axis z, a LED and at least one optical sensor.

In a known manner, such a toothed wheel 24 is associated with a device for detecting teeth (optical system with LEDs) borne by a printed circuit, in order to detect the characteristics (direction of rotation, amplitude, speed in particular) of the rotation of the jog wheel 2 (the angular position of the jog wheel 2 is determined here incrementally).

In order to provide for the rotation of the jog wheel 2, a ball bearing is implemented in a known manner. The ball bearing can be replaced with any other system known to those skilled in the art, particularly in the field of mixing consoles, for example, a bearing (smooth bearing, lubricated bearing, magnetic bearing), a needle bearing, etc.

Furthermore, a braking device intended to exert a more or less substantial force of friction on the outer circle of the ball bearing in order to brake the rotation is implemented.

In order to detect presses, most mixing controllers use a capacitive detection (for example, a CapSense® microcontroller). The capacitive detection makes it possible to detect a press on the means for controlling, without a translation of the plate of the jog wheel being indispensable (the translation of the plate can however be retained in order to offer the DJ a feeling close to that of a vinyl turntable).

Figure 3D:
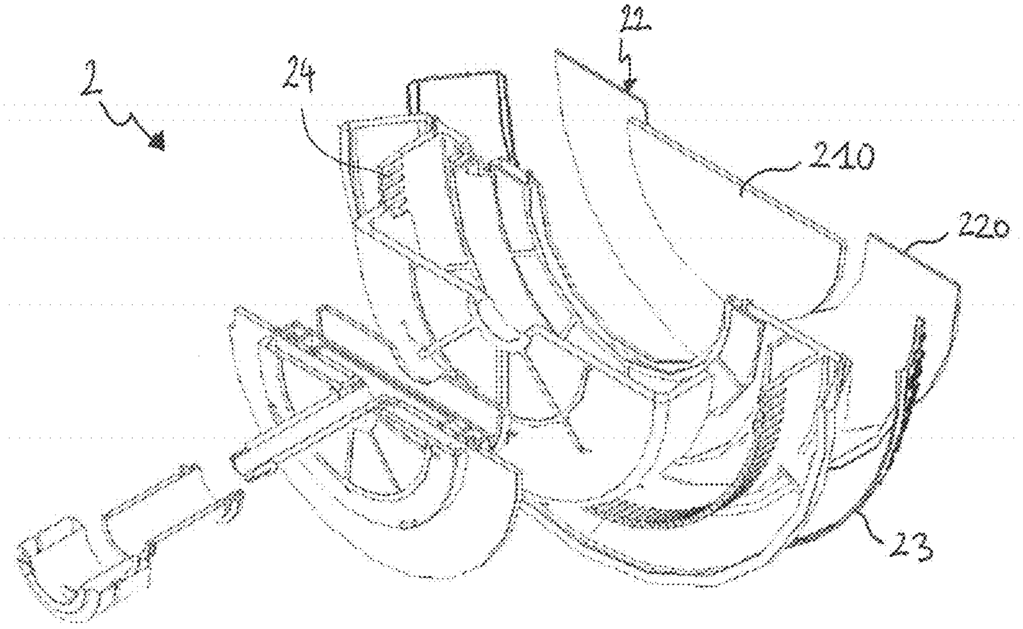
Figure 3E:
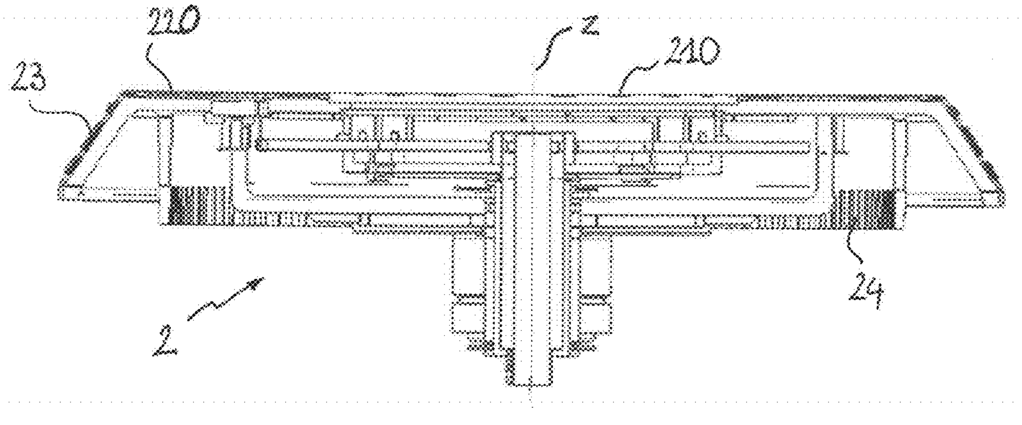
FIG. 3E is a cross-section view of the control device of FIGS. 3A and 3B.
Figure 3F:
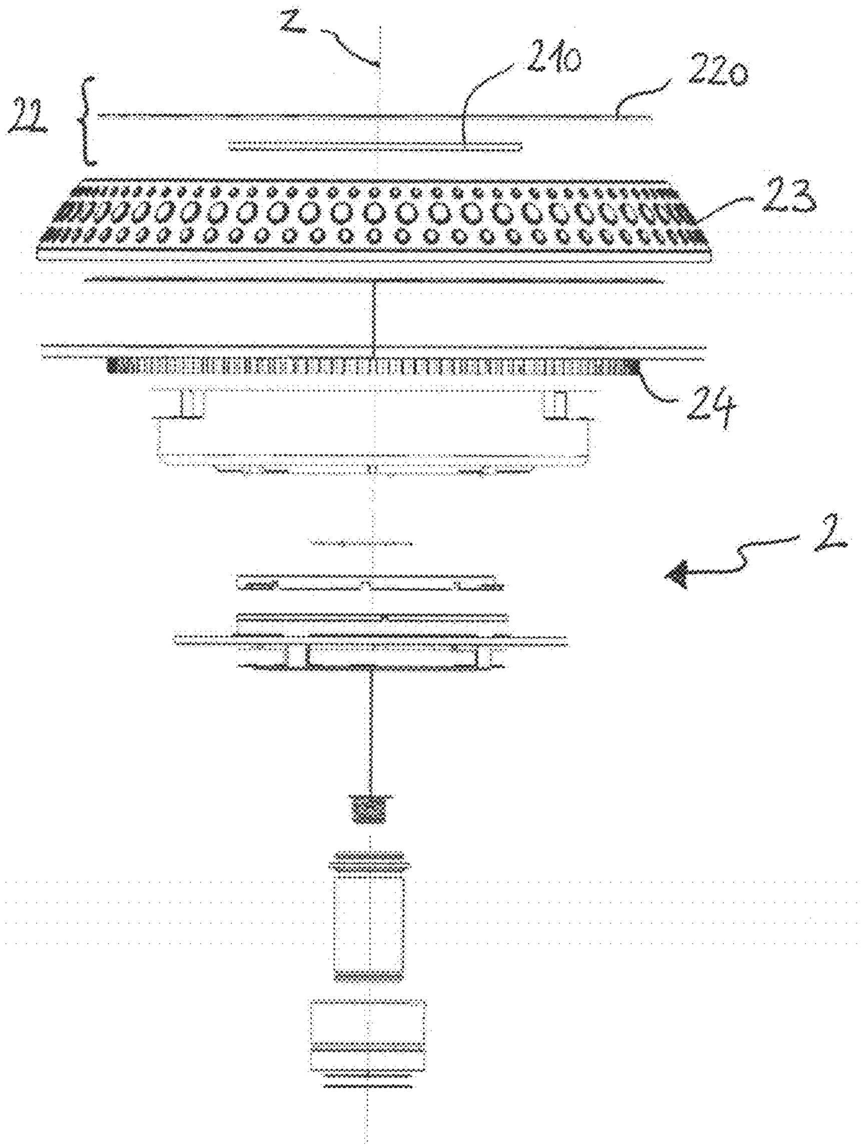

The display device (by LED, LCD or VFD) 21 is fixed, the jog wheel 2 using the mechanics shown in FIGS. 3C to 3F. As shown in FIG. 3D, the jog wheel 2 comprises a plate 220 made of metal for the capacitive detection. The plate 220 made of metal is here on the surface of the jog wheel 2 for aesthetical reasons but it could be covered with a shell made of plastic, for example so that a careful finish of the surface of the plate made of metal is not necessary. The metal plate 220 comprises a circular hole for a transparent disc 210 that makes it possible to see through transparency the screen and/or the LEDs.

The metal plate 220, the transparent disc 210 and the ring (crown) 23 of the jog wheel 2 are mounted mobile in rotation about the axis z with respect to a base. In the example shown in FIGS. 3A to 3F, there is no portion mobile in translation.

Figure 4:
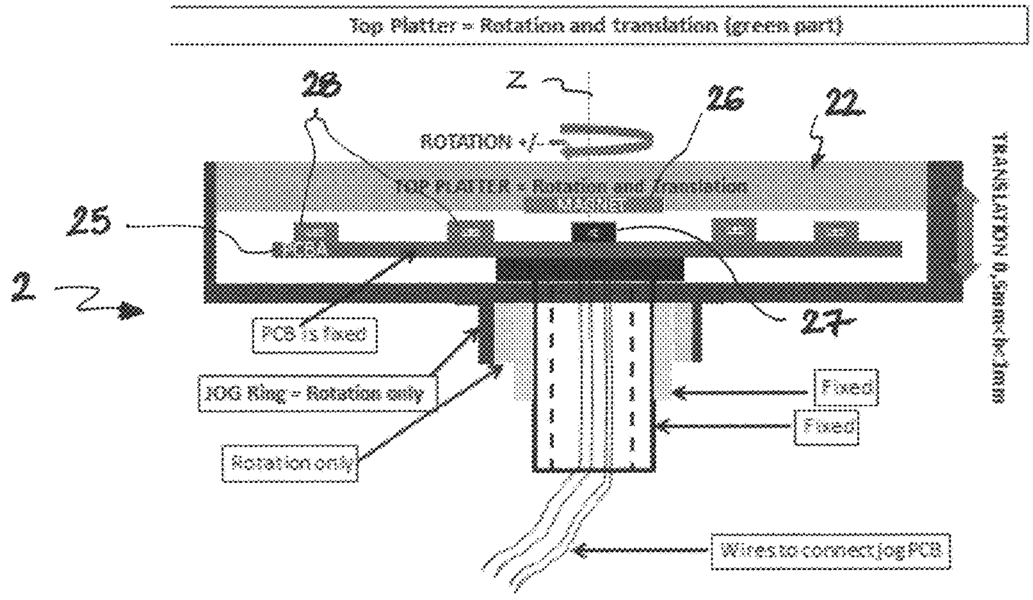
FIG. 4 is a cross-section diagrammatical view of a control device according to a second embodiment of the invention.

According to a second embodiment, described in relation with FIG. 4, a detection system by Hall effect (comprising at least one magnetic sensor and a magnet) is able to detect the rotation of the means for controlling the jog wheel 2.

The pushing in of a mobile portion of the jog wheel 2 (here the plate 22) and its rotation is detected using a single electronic component, namely a Hall effect sensor 27.

A fixed portion contains a printed circuit 25 (PCB or "Printed Circuit Board") with the Hall effect sensor 27, and a mobile portion rotates above the sensor. A magnet 26 is fixed to the plate 22.

The plate 22 is mobile in translation which makes it possible to vary the distance between the magnet 26 and the sensor 27. The Hall effect sensor 27 measures this variation, which makes it possible to detect if the plate 22 has been pushed in.

The plate 22 is mobile in rotation about the axis z and it is mobile in translation according to this axis z. It is displaced in rotation if the DJ exerts on the plate 22 an action in a direction substantially perpendicular with respect to the radius of the jog wheel 2 and with respect to the axis z. It is displaced in translation in case of a press of the hand or of several fingers of the user on the plate 22. The magnet 26 is placed substantially according to this axis z. As the magnet 26 is fixed to the plate 22, it rotates and is also displaced in translation.

The Hall effect sensor 27 and the magnet 26 are substantially aligned with the axis of rotation z of the jog wheel and therefore substantially aligned with the center of the jog wheel.

The Hall effect sensor 27 positioned under this magnet 26 makes it possible to measure the variation in the magnetic field and, consequently, the exact position in rotation, as well as in translation, of the plate 22. The variation in translation of the plate 22 makes it possible to detect if a force has been exerted on the top of the plate 22 and to detect the pushing in of it.

The single Hall effect sensor 27 is placed on the fixed printed circuit 25 and the magnet 26 is fixed on the plate 22 able to rotate above the sensor 27.

As the printed circuit 25 is fixed, it can comprise a screen and/or LEDs 28 that can be seen through the plate 22, with the latter then being transparent or translucent. This screen and/or these LEDs 28 can display a fixed logo and/or information for the user. It is also possible to fasten above the printed circuit 25 a fixed and backlit logo or drawing 211 at the center of the jog wheel 2.

The rotation of the magnet 26 makes it possible to vary the polarization of the magnetic field above the sensor 27 and as such makes it possible to precisely measure the absolute angular position. A simple magnet 26 cooperating with a Hall effect sensor 27 is sufficient for detecting the rotation in a very precise manner (for example, a Hall effect sensor with 14 bits of resolution offers a precision of about 0.02197° and at 16,384 steps per revolution of the jog wheel).

Furthermore, the plate 22 of the jog wheel 2 can be displaced slightly in translation vertically which varies the distance between the magnet 26 and the sensor 27 even at a very low degree (a few μm). This has for effect to modify the amplitude of the magnetic field (variation in gain) on sensor 27. It is as such possible to measure the displacement which is the equivalent to a detection of the touching of the plate 22.

In other terms, the plate 22 mobile in rotation accepts a slight translation which makes it possible to vary the distance between the magnet 26 and the sensor 27. The Hall effect sensor 27 measures this variation, which makes it possible to detect if the plate 22 has been pushed in.

A single electronic component, the sensor 27, and a single magnet 26 therefore make it possible to both precisely measure the rotation of the plate 22 of the jog wheel 2 and to detect the pushing in of it.

In order to provide for the rotation of the jog wheel 2, a ball bearing is implemented in a known manner. The ball bearing can be replaced with any other system known to those skilled in the art, particularly in the field of mixing consoles, for example, a bearing (smooth bearing, lubricated bearing, magnetic bearing), a needle bearing, etc.

Furthermore, a braking device intended to exert a more or less substantial force of friction on the outer circle of the ball bearing in order to brake the rotation is implemented.

According to a third embodiment, (not shown), the rotation of the means for controlling the jog wheel is detected by an optical system (an optical encoder comprising an encoding wheel, a LED and an optical sensor) and the detection of a press on the means for controlling is provided by one or several pressure sensors. Such a solution is described in particular in French patent application FR 2 968 101 which is incorporated by reference into this description.

The three embodiments described hereinabove can be combined.

As a first example, the detection of the rotation can be carried out by a detection system by Hall effect and the detection of a press can be carried out by a capacitive detection system.

As a second example, the detection of the rotation can be carried out by a detection system by Hall effect and the detection of a press on the means for controlling is provided by one or several pressure sensors.

Structure of the Display Zone of a Jog Wheel

Each jog wheel 2, 3 of the control device, or mixing controller, 1 comprises a display zone, or screen, that is fixed 21, 31 respectively, comprising two concentric circles C1, C2 of lighted indicators (LEDs here) arranged near the center of the jog wheel which is located on the axis z (the circles C1 and C2 may not be concentric). The circles C1 and C2 have for center the center of the jog wheel 2. However, the circles C1 and C2 can have separate centers. A logo or drawing 211 forms a fixed visual marking (with respect to the frame) that indicates a reference direction (direction whereon the "noon" position or graduation is or would be). The diameter of the jog wheels 2, 3 is, for example, about 150 millimeters but their diameter could be different.

Each indicator light of the circle C1 is placed substantially at the same distance from the consecutive indicator light of the circle C1. The points of location of the indicator lights of the circle C1 (and therefore of the lights of the circle C1) substantially form the vertices of a convex regular polygon (of which the number of sides is equal to the number of indicator lights of the circle C1 and of which each angle at the vertex is identical). This polygon is circumscribed in the circle C1 (the sides of this polygon form chords of the circle C1).

Likewise, each indicator light of the circle C2 is placed substantially at the same distance from the consecutive indicator light of the circle C2. The points of location of the indicator lights of the circle C2 substantially form the vertices of a convex regular polygon (of which the number of sides is equal to the number of indicator lights of the circle C2 and of which each angle at the vertex is identical). This polygon is circumscribed in the circle C2 (the sides of this polygon form chords of the circle C2).

The display zone can comprise a number of circles of indicator lights greater than two.

Figure 6:
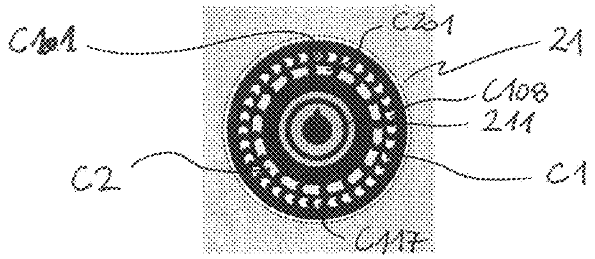
FIG. 6 shows the display device of a control device in accordance with the invention when the "scratch" mode is activated.

In the embodiment shown in FIG. 6, the display device 21 comprises the two concentric circles C1, C2 of LEDs, the inner circle C2 (of radius r) and the outer circle C1 (of radius R), arranged around the drawing 211 located at the center of the jog wheel 2. The circle C1 and a longitudinal axis y (i.e. a fictitious line passing through the center of the circle and oriented as the hour hand of a watch at noon, with this hand rotating around the center of the circle C1) have for intersections a "noon" position (or 12h00) on the circle C1 and a "six o'clock" position on the circle C1 (i.e. a position equivalent to the position of a graduation "6" or "VI" on the dial of a watch with hands). The circle C1 and a transverse axis x (i.e. a fictitious line oriented as the hour hand of a watch at 3h00) have for intersections a "three o'clock" position on the circle C1 (i.e. a position equivalent to the position of a graduation "3" or "III" on the dial of a watch with hands) and a "nine o'clock" position on the circle C1 (i.e. a position equivalent to the position of a graduation "9" or "IX" on the dial of a watch with hands). The center of the outer circle C1 and of the inner circle C2 are on the axis z (axis of rotation of the jog wheel). Seen from above (as in FIG. 2), the center of the circle C1 and the center of the circle C2 and the center of the jog wheel 2 are therefore substantially confounded.

The drawing 211 forms a fixed visual marking that indicates the "noon" position of the jog wheel and therefore of the two circles C1, C2. If an orthonormal marking is applied to the outer circle C1 of which the center is the origin of the marking, and of which an axis y (longitudinal axis y) is vertical and an axis x (transverse axis x) is horizontal, the "noon" position corresponds to the coordinates (y=1, x=0).

In FIG. 6, the LED C101 is located at these coordinates (y=1, x=0). In FIG. 6, the LED C117, opposite the LED C101 with respect to the center of the circle C1 (i.e. the LED located at the "six o'clock" position), is located at the coordinates (y=−1, x=0). Trigonometric functions make it possible to determine the location of each one of the LEDs. Indeed, the angle $\alpha$ with respect to the horizontal axis x can be determined because it depends on the number of LEDs of the circle. For example, if the circle C1 comprises 32 LEDs, its LED C108 therefore has an angle $\alpha$ of 360/32 i.e. 11.25 degrees with respect to the transverse axis, $\sin \alpha = y/R$, therefore $y = R \times \sin 11.25$ and $\cos \alpha = x/R$, therefore $x = R \times \cos 11.25$.

Likewise, the circle C2 and the longitudinal axis y have for intersections a "noon" position (or 12h00) on the circle C2 and a "six o'clock" position on the circle C2. The circle C2 and the transverse axis x have for intersections a "three o'clock" position on the circle C2 and a "nine o'clock" position on the circle C2. If an orthonormal marking is applied to the inner circle C2 of which the center is the origin of the marking, and of which an axis y (longitudinal axis y) is vertical and an axis x (transverse axis x) is horizontal, the "noon" position corresponds to the coordinates (y=1, x=0). In FIG. 6, the LED C201 is located at these coordinates (y=1, x=0). In FIG. 6, the LED opposite the LED C201 with respect to the center of the circle C2 (i.e. the LED located at the "six o'clock" position) is located at the coordinates (y=−1, x=0).

To each one of the lights of the circles C1, C2 corresponds one LED. The state of this LED is "ON" when the light is lit. The state of this LED is "OFF" when the light is turned off. According to the type of LED used, the LED can comprise other state ("color 1", "color 2", "color 3", etc., minimum lighting intensity, medium lighting intensity, maximum lighting intensity, etc.) and combinations of states (blinking of the LED, minimum lighting intensity in "color 3", etc.).

From the standpoint of the user, a first series of LEDs is arranged at regular intervals at the same distance (R) from the center of the jog wheel in such a way that these LEDs are arranged according to the circle C1. Similarly, a second series of LEDs is arranged at regular intervals at the same distance (r) from the center of the jog wheel in such a way that these LEDs are arranged according to the circle C2. The regularity of the intervals suggests graduations of a linear scale. The dimensions and the form of the lights of the circle C1 are different from the dimensions and from the form of the lights of the circle C2 so that the user understands immediately that the graduation scale of the circle C1 is different from the graduation scale of the circle C2. In this way, the user understands intuitively that the circle C1 is a first scale (linear scale) of graduation and that the circle C2 is a second scale (linear scale) of graduation.

The outer circle C1 comprises a first series of N lights.

The circle C2 comprises a second series of P lights.

The lights of C1 are arranged at regular intervals as such dividing the 360 degrees of the circle C1 by the number of lights N (i.e. every 360/N degrees). Each light of C1 is a level on a first graduation scale.

The lights of C2 are arranged at regular intervals as such dividing the 360 degrees of the circle C2 by the number of lights P (i.e. every 360/P degrees). Each light of C2 is a level on a second graduation scale.

Each light of C1, C2 therefore constitutes a visual marking of several graduation scales: C1 supplies the large divisions and C2 supplies the small divisions.

It is understood that if all of the lights of C2 represent a level of C1, then each light of C2 represents a fraction of a level of C1. Each light of C2 then represents a marking or level on a second graduation scale that is more precise than the first graduation scale (a graduation of C2 is P times more precise than a graduation of C1). The lights of C2 then constitute intermediate graduations of C1 (i.e. with respect to C1). By way of example, in "representation of the angular displacement" mode, if C1 is comprised of 32 lights, and C2 is comprised of 16 lights, then each light of C1 represents 360/32 degrees, or 11.25 degrees, and each light of C2 represents 11.25/16 degrees (or 0.703125 degrees). This jog wheel is then graduated every 0.703125 degree, from minus 359.296875 degrees to plus 359.296875 degrees.

The circles C1, C2 of the display device display a discontinuous variable (in other words, the variable represented on the display device, i.e. here the angle displayed by the lights of C1, C2 can only have a finite set of values). Consequently, the display device has a discrete nature although the actual angle of rotation of the plate is a continuous variable. In this way, the display device simplifies the information for the user and therefore the memorization of it by the user.

By making it possible to retain on the first external crown C1 a reduced number of steps (i.e. of divisions or graduations), the approach of the invention provides for the readability of the display zone. Furthermore, by offsetting on the second crown C2 intermediate steps between the steps of the first crown C1, the approach of the invention brings to the display the angular position of the jog wheel the same gain in precision as the minute hand provides on the dial of a clock (without the minute hand, it remains possible to read the time by looking at the position of the hour hand, but reading the time by looking only at the hour hand gives information that is not as precise and more difficult to read).

There is an interval (I) that is substantially identical between each light of the circle C1 (the number of intervals I is equal to N). Likewise, there is an interval (i) that is substantially identical between each light of the circle C2 (the number of intervals i is equal to P). The interval between the lights of the circle C1 is substantially identical to the interval between the lights of the circle C2. These intervals I and i are not lit in order to favor the contrast. These intervals provide for the readability of the graduations.

The graduations, in particular the graduations of the most precise graduation scale, can have an angular offset with respect to the "noon" direction (i.e. with respect to the longitudinal axis y). In this case, none of these graduations is located at an angular position equivalent to the angular position of a "noon" graduation on the dial of a watch with hands.

The absolute value of the angle formed by the intersection between on the one hand, a straight line confounded with the longitudinal axis y (the "noon" direction) and on the other hand, a straight line passing through the center of a circle of graduation and through the center of the light closest to the noon position is substantially between half of 360 degrees divided by the number of lights of this circle of graduation (in this case the light is not tangent with the "noon" direction unless the interval between the lights is zero) and the quarter of 360 degrees divided by the number of lights of this circle of graduation. Indeed, a light and an adjacent interval extend over an angle of 360 degrees divided by the number of lights of the circle of graduation, consequently the median angular position is half of 360 degrees divided by the number of lights, and on the other hand, an interval will rarely be longer than a light although this is possible.

In the embodiment corresponding to FIGS. 2, 6, 7 and 8, the LED C201 (the center of the corresponding light) of the circle C2 is substantially to the right of the "noon" direction (or 12h00) but substantially tangent with this direction (therefore the light has a slight angular offset in the clockwise direction). The angular offset of the LED C201 with respect to the "noon" direction is substantially equal to 360 degrees divided by 2 times the half of P (P being the number of lights of C2). In other words, the angular offset of the LED C201 with respect to the "noon" direction is substantially equal to ¼×360/P.

The LED C216 of the circle C2 is to the left of the "noon" direction (therefore the LED C216 has an angular offset in the anti-clockwise direction). The LEDs of C2 are not symmetrical with respect to the longitudinal axis y. The LED 101 of the circle C1 is exactly at a "noon" position or 12h00 (i.e. at a position equivalent to the position of a noon graduation generally indicated by "12" or "XII" on the dial of a watch with hands). The LEDs of C1 are positioned substantially symmetrical with respect to the longitudinal axis y. The LEDs of C1 are positioned substantially symmetrical with respect to the transverse axis x. In FIG. 8, the lights of the circles C1 and C2 have a form comprising a tip directed according to the clockwise direction.

As shown in FIG. 9, the circle C1 of LEDs has an angular offset with respect to the "noon" direction in such a way that none of the LEDs of C1 is in noon position (in other words, no LED is located at a position equivalent to the position of a "noon" graduation on the dial of a watch with hands). The circle C2 of LEDs has an angular offset with respect to the noon position (this offset is different from that of the circle C1—the offset of the LEDs of the circle C2 is a multiple of the offset of the LEDs of the circle C1—) in such a way that C2 does not comprise any LEDs at the noon position (or 12h00). In this way, visually when a first LED is lit on one of the circles C1 or C2, the lighting of it shows the direction of the rotation of the jog wheel. On each one of the circles C1 and C2, the LEDs are located symmetrically on either side of the longitudinal axis y (axis aligned with the "noon" and "six o'clock" positions). During the displacement in the piece of music or in a list of titles, or during the scratch, the direction of the rotation of the jog wheel is indicated visually by the angular position of the LED with respect to the "noon" position. If the activated LED (lit, for example) has an angular offset in the clockwise direction, this indicates a rotation of the jog wheel according to the clockwise direction. Inversely, if the activated LED has an angular offset in the anti-clockwise direction, this indicates a rotation of the jog wheel according to the anti-clockwise direction.

In the embodiment corresponding to FIG. 9, the LED C201 of the circle C2 is to the right of the "noon" direction (therefore the LED C201 has an angular offset in the clockwise direction).

At the location of the noon position on the circle C2 is an interval (interval between the LEDs C201 and C216).

The angular offset of the LED C201 with respect to the "noon" direction is substantially equal to 360 degrees divided by half of P (P being the number of lights of C2). In other words, the angular offset of the LED C201 with respect to the "noon" direction is substantially equal to ½×360/P.

The LED C216 of the circle C2 is to the left of the "noon" direction (therefore the LED C216 has an angular offset in the anti-clockwise direction). In absolute value, this angular offset is identical to that of the LED 201 of the circle C2.

The LEDs of C2 are substantially symmetrical with respect to the longitudinal axis y. The LEDs of C2 are also substantially symmetrical with respect to the transverse axis x.

One LED and one interval of C2 extend over an angle of 360 degrees divided by the number of LEDs of the circle C2.

At the location of the noon position on the circle C1 is an interval (interval between the LEDs C101 and C132).

The LED C101 of the circle C1 is to the right of the "noon" direction (therefore the LED C101 has an angular offset in the clockwise direction).

The angular offset of the LED C101 with respect to the "noon" direction is equal to 360 degrees divided by half of N (N being the number of lights of the circle C1). In other words, the angular offset of the LED C101 with respect to the "noon" direction is substantially equal to ½×360/N.

The LED C132 of the circle C1 is to the left of the "noon" direction (therefore the LED C132 has an angular offset in the anti-clockwise direction). In absolute value, this angular offset is identical to that of the LED C101 of the circle C1.

The LEDs of the circle C1 are positioned symmetrically with respect to the longitudinal axis. The LEDs of the circle C1 are also positioned symmetrically with respect to the transverse axis.

In FIG. 9, the lights of the circles C1 and C2 are in the form of an arc of circle. The interval between the lights of the circle C1 is substantially identical to the interval between the lights of the circle C2. The length of the arc of circle of the lights of the circle C2 is substantially different from the length of the arcs of circles of the lights of the circle C1 because the circles C1 and C2 do not have the same radius (furthermore, they do not comprise the same number of lights and a larger interval between the lights of the circle C2 could incorrectly suggest less precision).

The lights of the LEDs of the circles C1 and C2 have a central symmetry. The lights of the LEDs of the circle C1 have a central symmetry of which the center of symmetry is the center of the circle C1 (this center is substantially aligned with the axis z). The lights of the LEDs of the circle C2 have a central symmetry of which the center of symmetry is the center of the circle C2 (this center is also substantially aligned with the axis z).

On the circle of graduation C1, one LED and one interval extend over an angle of 360 degrees divided by the number of LEDs of C1.

In this way, an angle displayed by the circle of graduation C1 corresponds to an angle of the displacement in rotation of the jog wheel (on the scale of C1).

It is possible to implement at regular intervals on the circle C1 and on the circle C2 lights of a different form or of a color different from those of the lights of the same circle. For example, the LEDs C104, C112, C120, and C128 can be monochromic of a different color or be lit with a color or with a light intensity different from those of the other lights of C1 in order to indicate information such as the eights of revolution and facilitate the memorization of a LED (and of an angular position corresponding to this LED). Likewise, the LEDs C108, C116, C124, and C132 can be or be lit with another color in order to indicate information such as quarter revolutions. The differences in form and/or in color can be also used to display the graduations of a non-linear scale.

The mixing controller 1 offers at least two playback speeds (33 rpm and 45 rpm) as a record player.

At the speed of 33 rpm, one revolution (360°) of the plate corresponds to 60 seconds divided by 33 i.e. about 1.818 seconds.

If one revolution of the plate corresponds to 32 LEDs of the outer circle C1, each LED of C1 corresponds to the duration of one revolution divided by the number of LEDs of C1 i.e. 1.818/32 therefore about 0.056 seconds. A LED of C1 therefore covers 56 thousandths of a second (at the speed of 33 rpm). The latency therefore does not have any visible consequences for the user (but the precision offered by the circle C1 is not sufficient because, in 56 thousandths of a second, at only 33 rpm, the plate already rotates 11.25 degrees).

However, the inner circle C2 (here, it comprises 16 LEDs) is used to multiply the precision.

Here, a LED lit on the outer circle C1 is equivalent to sixteen LEDs lit on the inner circle C2.

One revolution of the plate therefore corresponds to 512 (32×16) lightings of LEDs on the circle C2. Each LED of the inner circle C2 corresponds to 1.818 divided by 512, i.e. about 0.00355 seconds. A LED of C2 covers 3.55 thousandths of a second. Consequently, a latency would be perceptible on the screen of a computer although it is not on the LEDs of C2.

The functions assigned to the display zone 21 vary according to the mode (playback mode, scratch mode, piece of music selection mode, etc.). According to the program that controls the display zone 21, this display can as such be used for different functions.

Playback Mode

In playback mode, one of the circles C1, C2 of LEDs (in blue, for example) shows the instantaneous speed and the second circle (in white, for example) shows the position (of a virtual playback head) in the audio track of the piece of music played.

More precisely, during the playback of a piece of music, the screen 21, 31 of each jog wheel 2, 3 runs the two concentric circles C1, C2:

- the largest outer circle C1, at the edge of the screen, rotates (gives the impression of rotating) as a motorized plate of a vinyl turntable (i.e. at 33 rpm, for example), its rotation speed then varying according to the "pitch" setting (corresponding to the modification of the playback speed of a piece of music);
- the smallest central circle C2 (inside the circle C1) shows the position in the piece of music broken down into segments (sixteen segments in the embodiment shown), with the number of lit segments indicating the position in the piece of music, ranging from one lit segment at the beginning of the piece to sixteen segments lit at the end of the piece of music.

In playback mode, the instantaneous playback speed can be represented by a single light which is displaced according to a circular trajectory. However, the instantaneous speed can be shown in another form, for example that of a plurality of lights lit or turned off immediately next to one another, i.e. an arc of circle lit or dark (since the LEDs are arranged in such a way as to form circles) which is displaced according to a circular trajectory giving the impression of lighted movement produced by successively lighting and turning off a series of lamps or LEDs (in the manner of a chase).

One of the circles C1, C2 of LEDs (in particular the inner circle C2) can also be used to indicate points of marking that facilitates the blocking of the tracks between them while the other circle (the outer circle C1) shows the position (of a virtual playback head) in the audio track of the piece of music played or in the video track played.

Scratch Mode

In scratch mode, the music track is played at the rotation speed of the jog wheel.

It is read backward if the DJ rotates the jog wheel in the anti-clockwise direction, while if the DJ rotates the jog wheel in the clockwise direction, the music track is played forward. During the scratch, the hand of the user therefore controls the playback of the music track.

The DJ is guided by the display device (or screen, or display) 21, 31 which displays the angular displacement of the plate 22, 32. The display device gives a reference of angular displacement (the angle zero, i.e. the absence of displacement in rotation of the jog wheel) on a horizontal plane and displays a visual representation of the measurement of horizontal angles with respect to this reference. In practice, the central display device 21, 31 indicates to the user how the jog wheel 2, 3 has rotated during the scratch and where to return in order to retrieve the beginning of the scratch (or the beginning of a series of successive scratches). The LEDs display the angular displacement of the plate 22, 32 of the jog wheel 2, 3.

The plate of the jog wheel 2, 3 has two chases C1, C2:

C1, the chase of larger diameter, has N lights. In angular representation mode, each light represents 360 degrees divided by N (i.e. 360/N degrees) and a marking or level on a first graduation scale of a variable consisting of an angle of rotation of the plate about the axis z;

C2, the smaller chase, concentric of C1 and placed inside C1, has P lights. In angular representation mode, all of the lights of C2 (i.e. when they are all activated) represents the same number of degrees as one activated light of C1. As such, each activated light of C2 represents 360/N/P degrees. One graduation (or division) of C2 is P times smaller than one graduation of C1.

The lights of C2 constitute intermediate graduations of C1 (i.e. with respect to C1). In other words C2 displays the intermediate angles (orientations).

C1 displays the angular displacement on the scale 1 to 1 (1 revolution displayed=1 actual revolution) while C2 displays the angular displacement with an enlargement on the scale N to 1 (N revolutions displayed=1 actual revolution).

Each light of C1 constitutes a visual marking of a first graduation scale. Each light of C2 constitutes a visual marking of a second graduation scale.

By way of example, if C1 is comprised of 32 lights, and C2 is comprised of 16 lights, then each activated light of C1 represents 360/32 degrees, or 11.25°, and each activated light of C2 represents 11.25/16 degrees, or 0.703125° (which, in this portion of the description, shall be written "0.7°" in order to not needlessly complicate the disclosure).

The interval I (still not activated) between each light of C1 does not represent an angle. Likewise, the interval i (still not activated) between each light of C2 does not represent an angle (these are visual separations between graduations).

In practice, the user places his hand on the plate 22 of the jog wheel 2, for example. The sensor built into the plate 22 detects that the hand has been placed, and the screen 21 passes to "representation of the angular displacement" mode (it may be that the display device 21 was displaying other information beforehand).

The user then rotates the plate 22 by A degrees, by maintaining his hand on the plate 22, with A=B1×(360/N)+B2×(360/N/P), B1 and B2 being integers.

The display step of C2, which corresponds to the number of degrees that must be reached in order for the rotation to be displayed, is equal to 360/N/P.

The display device 21 then shows the user a displacement of B1 lights on the chase C1, and of B2 lights on the chase C2.

As the LEDs of C1 show an angular displacement approximately of the same angle as the angle formed by the plate 22 of the jog wheel 2, the user can refer to this, without seeking to read it, in order to intuitively return to the position of his choice.

Note, moreover, what follows:

Ideally, the step of the sensor that measures the angular displacement of the plate 22 is either equal to the display step, or a multiple of the display step, on the chase C2. As such, ideally, the step of the sensor of angular displacement is equal to 360 degrees divided by N and by P (or 360/N/P), or half of 360 degrees divided by N and by P (½×360/N/P), or a third of 360 degrees divided by N and by P (or ⅓×360/N/P). In the case where C1 has 32 lights and C2 has 16 lights, then ideally, the step of detection of the rotation of the plate 22 is equal to 360/32/16, or 0.7°, or a multiple of 0.7°, or 0.7° is a multiple of the size of this step. For example:

a sensor step of 1.4° (corresponding to 2×0.7) or 2.1° (corresponding to 3×0.7) can be displayed (the display on C2 moves or increases then by block of 2 or 3 LEDs);

a sensor step of 0.35° (corresponding to 0.7/2) or 0.235° (corresponding to 0.7/3) can also be displayed (the display on C2 moves or increases then one LED by one LED).

If the detection step of the rotation sensor is not a multiple of the display step (360/N/P degrees), and if the display step is not a multiple of the step of the sensor, it remains possible to use the display C2 in scratch mode. A processing is then provided, in this case implemented by a processor (or software) which proceeds with an interpolation in order to assign to the steps of the sensor a display on the chase C2, since all of the steps of the sensor will not be able to be displayed in a uniform manner.

For example, if C1 has 32 LEDs, and C2 has 16 LEDs (therefore a display step of 360/32/16 equal to 0.703125), and if a rotation sensor of 768 steps per revolution is implemented (and therefore one step of the rotation sensor of 360/768, or 0.46875 degrees), then, due to the fact that 0.70325×2 is equal to 0.46875×3, the processing assigns for example:

for the 1st step (of the sensor): the 1st LED on C2
for the 2nd step: nothing
for the 3rd step: the 2nd LED on C2
for the 4th step: the 3rd LED on C2
for the 5th step: nothing
for the 6th step: the 4th LED on C2
for the 7th step: the 5th LED on C2
for the 8th step: nothing
for the 9th step: the 6th LED on C2
for the 10th step: the 7th LED on C2
for the 11th step: nothing
for the 12th step: the 8th LED on C2
for the 13th step: the 9th LED on C2
for the 14th step: nothing
for the 15th step: the 10th LED on C2
for the 16th step: the 11th LED on C2
for the 17th step: nothing
for the 18th step: the 12th LED on C2
for the 19th step: the 13th LED on C2
for the 20th step: nothing
for the 21st step: the 14th LED on C2
for the 22nd step: the 15th LED on C2
for the 23rd step: nothing
for the 24th step: the 16th LED on C2

The display in scratch mode is described more precisely in what follows.

The outer circle C1 of LEDs offers a first level of precision and the inner circle C2 of LEDs offers a second level of precision. In other terms, the two circles C1, C2 of LEDs are used in order to multiply the precision of the display.

As a general rule, before starting a scratch, the playback mode is active. Consequently, the circles C1, C2 of LEDs are already providing the user with information. For example, a chase (in blue, for example) rotates on the circle C1 and the second circle C2 shows the position (of a virtual playback head) in the audio video track played, i.e. the portion already played.

When the DJ starts the scratch mode, all of the LEDs of one of the circles C1, C2 except one LED are turned off. In other words, at the instant when the scratch mode becomes active, on one of the circles C1 or C2, a single LED is lit to signal the point of departure of the scratch.

On the visual of FIG. 6, it is the LED C101 of the outer circle C1 that is lit when the DJ activates the "scratch" mode. It could however be a LED of the inner circle C2. This LED can be lit in red color, for example. This first LED C101 can be lit with a color that is different from that of the other LEDs of the same circle C1.

Moreover, it is not necessarily the LED C101 located "at noon" (as in FIG. 6) that is lit or remains lit. Indeed, the LED that is lit is preferably the LED that corresponds to the last position B0 of a virtual playback head in a piece of music, the last LED that was lit on C1 in playback mode (therefore a marking of the playback position in playback mode).

B0 corresponds to the angular position of a playback head (or tip) on a vinyl record with respect to its vinyl turntable, disc whereon the piece of music would be recorded and played by this vinyl turntable, as the whole is virtual. In this way, the angular displacement displayed or represented on one of the circles C1, C2 always corresponds substantially to the position of the virtual playback head (such as the position of a playback tip of a vinyl turntable during a scratch). Consequently, the display device displays on the outer circle C1 the position of the virtual playback head (i.e. its angular position) and the scratch begins where the virtual playback head is positioned (i.e. starting from this angular position B0).

Moreover, the mixing controller 1 can implement jog wheels 2, 3 comprising in addition to the detection of a press or not, a detection of the zone where the press is exerted by the user. In this case, the LED of C1 or C2 which is the closest to the angular position of the pressing zone can be lit in order to serve as a point of departure of the scratch and an intuitive reference for the user for the scratch.

Then (still in scratch mode), when the DJ rotates the jog wheel 2 in the clockwise direction and/or in the anti-clockwise direction (the user can in particular exert a back-and-forth movement), the illuminated zone extends or retracts according to the direction of the rotation of the jog wheel 2, or the illuminated zone is displaced according to the direction of the rotation of the jog wheel 2. Consequently, a cursor or index (according to the Centre National de Ressources Textuelles and Lexicales, the definition of a first index is a "needle or any other mobile objet that supplies indications by travelling through divisions on a dial or along graduated markings") supplying indications on the angular displacement of the jog wheel travel the outer circle C1 of LEDs and a second index travels the inner circle C2 of LEDs (more precisely, the cursor or the index is the LED that has just changed state i.e. that has just, for example, been turned off or lit on the circle considered).

The point of departure B0 (here, the LED C101) of this displacement can also continue to be indicated on the display device.

For example, when the DJ rotates the jog wheel 2 in the clockwise direction, the illuminated zone extends in the clockwise direction on the outer circle C1 of LEDs and on the inner circle C2 of LEDs in order to show the position of a virtual playback head and the origin (point of departure) of the displacement of this virtual playback head.

Figure 7:
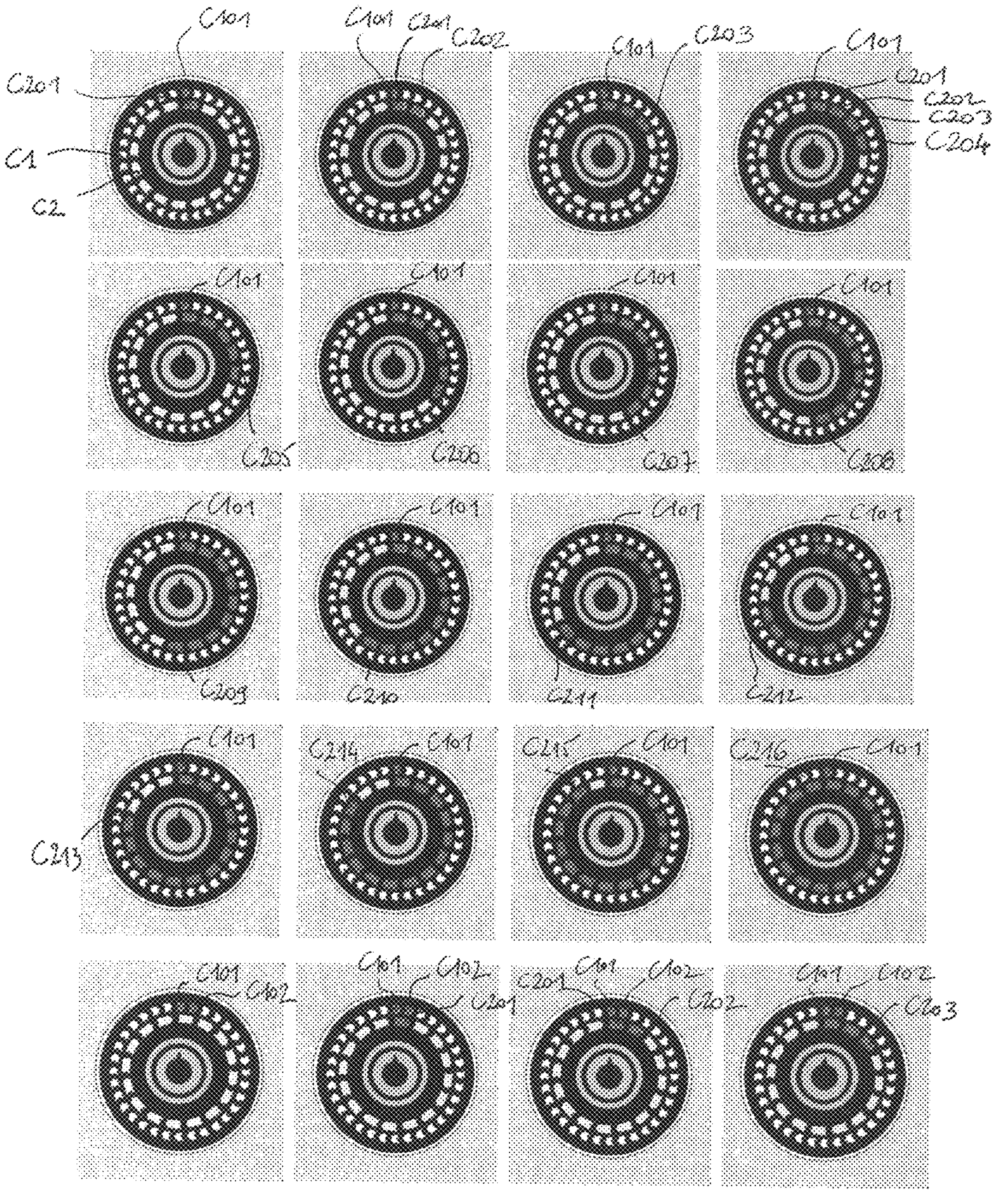
FIG. 7 shows the display device of a control device in accordance with the invention when the "scratch" mode is activated, as the user rotates the means for controlling of the control device.

As shown in the visuals of FIG. 7 (the chronological order of these visuals being from left to right, from top to bottom), the illuminated zone extends first on the inner circle C2 of LEDs, then on the outer circle C1 of LEDs in order to show the displacement of the position of a virtual playback head (the DJ rotating the jog wheel in the clockwise direction). As such, on the first visual at the top left, the LED C201 of the inner circle C2 and the LED C101 of the outer circle C1 are lit. At this step, the LED C201 constitutes an index since it has just been turned on. The LED C201 constitutes a marking corresponding to the graduation+0.703125°. With the LED C201 being lit and the following or consecutive LEDs C202 corresponding to the graduation+1.0625° being turned off, the angular displacement of the plate is then an angle between these two graduations (the first graduation is included because the LED C201 is lit and the second graduation is not included because the LED C202 is turned off), i.e. between the limits [+0.703125°, +1.0625° [. The LED C101 of the outer circle C1 remaining lit (it corresponds here to B0), the LEDs C202 to C216 are lit one after the other, until all of the LEDs C201 to C216 of the inner circle C2 are lit. When the DJ again rotates the jog wheel 2 in the clockwise direction, the LEDs C201 to C216 of the inner circle C2 are turned off, the LED C102 of the outer circle C1 is turned on (the LED C101 of the outer circle C1 remains lit), and again the LEDs of the inner circle C2 are lit one after the other (the visuals show only the LEDs C201 to C203 lit). The step where all of the LEDs of C2 are lit and one additional LED of C1 is lit is not shown.

In order to return to the beginning of the beat in a scratch, the DJ displaces the jog wheel 2 in the opposite direction (following the preceding case, he displaces it in the anti-clockwise direction) until reducing the illuminated zone precisely to what it was at the beginning of the scratch, on one LED (namely the LED C101 as shown in FIG. 6). It is then sufficient for him to stop exerting pressure on the plate so that the playback mode becomes active again. Consequently, the scratch is completed where the virtual playback head is positioned (i.e. at its angular position). If the user desires, this angular position therefore corresponds to that where the virtual playback head was when the user started the scratch (at the last position of the marking in playback mode).

Thanks to the LEDs, in scratch mode, the user has graduations and information on the graduated angular position supplied by the lit LED or LEDs of the circles C1 and C2. Thanks to the drawing 211 (indicating the "noon" positions), the user has a visual reference for this graduated information. The intermediate graduations allow him to bring the jog wheel precisely to the desired position (and therefore to the desired location in the audio video track).

Functional Diagrams of the Lighting of the Plate

Figure 5:
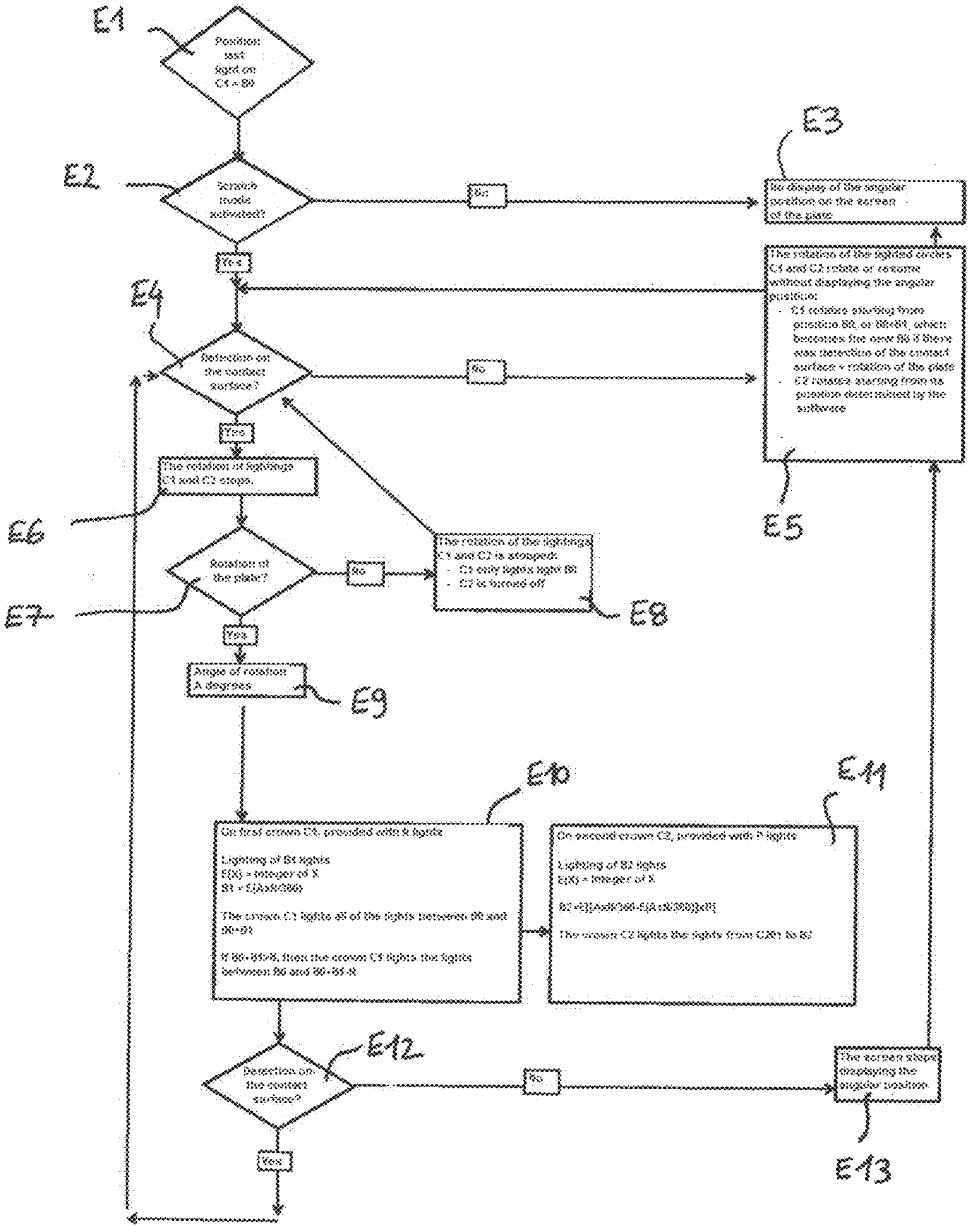
FIG. 5 is a diagram that describes an operating mode of the display device implemented in a control device in accordance with the invention.

FIG. 5 is a functional diagram of the lighting of the plate in order to indicate the origin of the angular displacement of the latter and the current angular position of the latter on the two circles or crowns of lights C1 and C2.

In this diagram, A is the angle of rotation of the plate of the jog wheel at an instant during the scratch. A=360 degrees maximum during the scratch (beyond this value, the system still operates, see the example 2 hereinbelow). A can be positive or negative.

C1 is a first set of lights (that can be lit) arranged in a circle on (under) the plate of the jog wheel. C1 is a circle close to the hand of the user (DJ or VJ) when his hand presses on the plate during the scratch. N is the number of lights (for example, a number of LEDs) of C1.

C2 is a second set of lights (that can be lit) arranged in a circle. C2 is a circle inside C1. In this way C2 is farther away from the hand of the user.

Each LED of C1, C2 according to the state of this LED is used by the user as a visual marking of displacement and of position. Furthermore, that state of a LED corresponding to the position of a "cue point" (marking that is assigned to a location in an audio, video or effects track and which makes it possible to resume the playback of the track at this location) can be different from those of the LEDs which do not correspond to the position of a "Cue point" so that the user easily identifies the "cue points".

C1 covers 360 degrees. When all of the LEDs of C1 are lit, C1 shows an angle of rotation which is a multiple of 360 degrees. The LEDs of C1 correspond to a first level (or scale) of graduation. C1 displays in full scale, i.e. on the scale 1/1, the angular position of the plate (1 revolution displayed=1 actual revolution). The lighting of C1 follows the angular displacement of the plate. In this way, the display corresponding to the displacement in rotation of the means for controlling is implemented on the circle of larger diameter.

C2 displays the intermediate steps of C1. Consequently, when all of the LEDs of C2 are lit, C2 shows alone an angle of rotation (the angular position of the plate) of 360 degrees divided by the number of lights of C1. The graduation scale of C2 is N times the graduation scale of C1. If we return to the preceding example, when the plate is displaced 33.75 degrees i.e. 3×11.25°, C1 carries out less than one eighth of a revolution while C2 carries out 3 revolutions which would therefore correspond to 1080 degrees—if the scale of C2 were the same as that of C1—).

As such, C2 displays the displacement with an enlargement (the factor N) i.e., on the scale N/1 (N revolutions displayed=1 actual revolution). When the user rotates the jog wheel during the scratch, the display of C2 rotates N times more than the display of C1 (N is the number of lights of C1). In other words, the lights activated on C2 seem to rotate N times more than the lights activated on C1.

In order to perform a scratch, the user places his hand (or his fingers) on the plate at the periphery of C1. C2 being inside C1, it is preferable that C2 display the intermediate steps of C1 (and not the reverse: that C1 display the intermediate steps of C2) as C1 displays on the scale 1 to 1 and is the closest to the hand of the user while C2 displays a multiple of the scale of graduation of C1 (C2 displays the product of the angle of rotation by the number of lights of C1). If C1 displayed the intermediate steps of C2, the hand of the user would risk following (in a sometimes untimely manner) the lighted displacement on the circle the closest to it (i.e. C1), while the displacement displayed by C1 is then a multiple of the actual displacement of the plate.

P is the number of lights (for example, a number of LEDs) of C2. The LEDs of C2 therefore correspond to a second level of graduation that is more precise than the first level of graduation of C1.

The LEDs of C1 are lit starting with B0 (and not systematically starting from the LED C101 of C1 which is located at noon) i.e. from the last position of a virtual playback head, position which was displayed on C1, in playback mode, just before the stopping of the rotation of the lights (the initial angular position B0 as such corresponds to the position of origin of a virtual playback head in the piece of music).

In this way, the DJ begins his scratch using the last position of the virtual playback head and at the end of his scratch, if he so desires, the DJ returns exactly to this position.

It is therefore considered in the step E1 that the position of the last light activated on the circle C1 is B0 (last position of a virtual playback head in the piece of music in playback mode). It is detected in the step E2 whether or not the "scratch" mode is activated. If not, there is no display of the angular position of the plate 22 on the screen 21 (step E3). If yes, a possible pressure is detected on the plate (step E4). If no pressure is detected, the playback (see the section on the description concerning playback mode) of the piece of music begins (if the user activated the scratch mode before launching the playback mode) or is continued (if the user activated the playback mode before launching the scratch mode) or resumes (if, in scratch mode, the user stops exerting a pressure on the plate), the rotation of the lighted circles C1, C2 is initiated, or continues or resumes without displaying the angular position of the plate (step E5). C1 rotates starting from the position B0, or B0+B1 (or B0+B1−N or B0+B1+N), which becomes the new B0 if there was a detection on the contact surface and a rotation of the plate. C2 rotates starting from the position in the piece of music which is determined by the mixing software executed by the computer (or by other means for processing). If a pressure is detected, the rotation of the lighting C1 and C2 stops (step E6). It is then detected if there is a rotation of the plate (step E7). If no rotation is detected, but only the light B0 of C1 is lit, the lights of C2 all being turned off (step E8). A possible pressure on the plate (step E4) is then detected. If a rotation of the plate is detected, in step E9 the angle of rotation equal to A degrees is determined.

Then, in the step E10, B1 lights of the crown C1 (provided with N lights) are lit (as such, all of the lights located between B0 and B0+B1 are lit) with the understanding that B0 is not touched which remains lit to serve as a marking of origin as long as a pressure on the plate is detected. B1 is equal to E(A×N/360) with E(X)=integer portion of X. If B0+B1 is greater than N, then the crown C1 lights the lights located between B0 and B0+B1−N. Inversely, if B0+B1 is less than −N, then the crown C1 lights the lights located between B0 and B0+B1+N. As a complement, in the step E11, B2 lights of the crown C2 (provided with P lights) are lit. As such, the crown C2 lights the lights of C201 to B2, with B2 equal to E((A×N/360−E(A×N/360))×P) and E(X)= integer portion of X.

Another possible pressure on the plate is then again detected (step E12) in order to determine if the user has finished his scratch or not (as with a vinyl turntable, the user maintains a pressure on the disc as long as the scratch is not complete). If such a pressure is detected, the step E4 is again implemented. In the opposite case, the screen stops displaying the angular position (step E13), then the step E5 is implemented.

Example 1

Rotation by +92 degrees of the plate (therefore A=92) starting from B0 which is here, by hypothesis, the LED C108. C1 comprises 32 lights (therefore N=32) and C2 comprises 16 lights (therefore P=16).

How many steps (how many lights are to be lit) on C1 is calculated. The number of lights of C1 to be lit depends on the angle of rotation (that the user will have to bring back to zero in order to return to B0 and therefore to the beginning of the scratch) and on the number of lights of C1.

$$B1=E(A\times N/360)$$

$$B1=E(92\times 32/360)$$

$$B1=E(92\times 32/360)$$

$$B1=E(8{,}177777777777778)$$

$$B1=8$$

Consequently, eight LEDs are to be lit on C1 (these eight LED correspondent to an angle of rotation of at least 90 degrees).

Since B1 is positive, 8 lights are selected in the clockwise direction.

$$B2=E([[A\times N/360]-E([A\times N/360])]\times P)$$

B2 is the integer portion of the product of the remainder of C1 by the number of lights of C2.

$$B2=E([[92\times 32/360]-E([92\times 32/360])]\times 16)$$

$$B2=E([8,177777777777778-E(8,177777777777778)]\times 16)$$

$$B2=E([8,177777777777778-8]\times 16)$$

$$B2=E([0,177777777777778]\times 16)$$

$$B2=E(2.8444444444444)$$

$$B2=2$$

Consequently, two LEDs are lit on C2 (these two LEDs correspond alone to an angle of rotation of 1.40625 degrees).

These two LEDs are lit starting from C201 (i.e. the LED of C2 which is the closest to 'noon' in FIGS. 2, 6 and 8) included. Since B2 is positive, two lights in the clockwise direction are illuminated.

The remainder of C1 and C2 is ignored i.e. 0.59375 degrees (except if there is a circle C3, and even other additional circles, in order to display the intermediate steps or graduations of C2).

Example 2 (this is an Unlikely Case but the Device Must not have any Malfunction in Such a Case)

Rotation of +452 degrees of the plate. C1 comprises 32 lights and C2 comprises 16 lights.

$$B1=E(A\times N/360)$$

$$B1=E(452\times 32/360)$$

$$B1=E(452\times 32/360)$$

$$B1=E(40,177777777777778)$$

$$B1=40$$

But B1>N, now if B0+B1>N, then the crown C1 illuminates the lights between B0 and B0+B1−N. On C1, the lighting of 40−32=8 LEDs are therefore selected.

Consequently, eight LED are lit on C1 (these eight LEDs correspond to an angle of rotation of at least 90 degrees—the DJ being a priori able to remember that he has carried out more than one revolution (all the more so as in general the rotation during a scratch is less than 360 degrees because otherwise the user risks missing his scratch). However, in an embodiment, as long as A is greater than 360 degrees, the LED corresponding to the position B0 on C1 can blink in order to signal to the user that the angle A is greater than 360 degrees.

Therefore, the following LEDs of C1 are lit (in addition to C108), namely the LEDs C109, C110, C111, C112, C113, C114, C115, C116.

$$B2=E([A\times N/360-E(A\times N/360)]\times P)$$

$$B2=E([452\times 32/360-E(452\times 32/360)]\times 16)$$

$$B2=E([40.177777777777778-E(40,177777777777778)]\times 16)$$

$$B2=E([40.177777777777778-40]\times 16)$$

$$B2=E([0.177777777777778]\times 16)$$

$$B2=E(2.8444444444444)$$

$$B2=2$$

Consequently, two LEDs are lit on C2 (these two LEDs correspond alone to an angle of rotation of 1.40625 degrees). Since B2 is positive, two lights on C2 are selected in the clockwise direction. As such, the following lights C201, C202 are lit.

Figure 10:
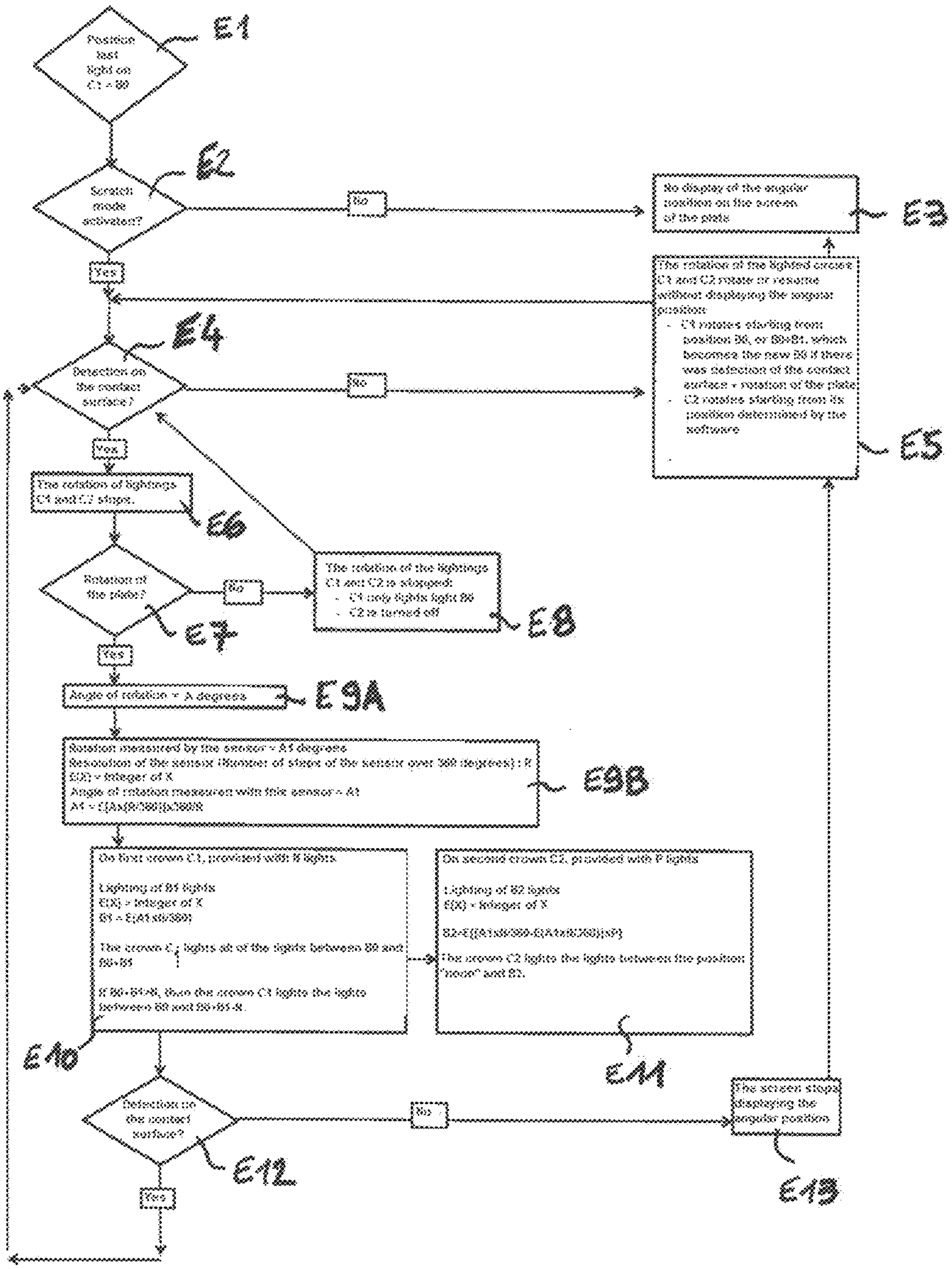
FIG. 10 is a diagram that describes an operating mode of the display device implemented in a control device in accordance with the invention.

FIG. 10 is a functional diagram of the lighting of the plate in order to indicate on the two crowns of lights C1 and C2 the extent of the angular displacement of the latter from the origin to the current angular position.

In this diagram, A is the actual angle of rotation of the plate of the jog wheel at an instant during the scratch.

The sensor that measures the displacement in rotation of the plate supplies an approximation of the actual displacement of the plate which depends on the step of the sensor. In this diagram, A1 is the angle of rotation of the plate of the jog wheel obtained thanks to the sensor at an instant during the scratch.

A1=360 degrees maximum during the scratch. A1 can be positive or negative.

R is the resolution of the sensor (number of steps of the sensor covering 360 degrees).

The steps E1 to E7, E12 and E13 are identical to those of the functional diagram of FIG. 5.

It is detected if there has been a rotation of the plate (step E7). If no rotation is detected, only the light B0 of C1 is lit to serve as a zero marker (A1=0), the lights of C2 all being turned off (step E8). A possible pressure on the plate (step E4) is then detected. When a rotation of the plate is detected, the angle A of rotation of the plate is measured (step E9A and in the step E9B the angle of rotation equal to A1 degrees is determined. A1 is equal to E(A×(R/360)]×360/R) with E(X)=integer portion of X.

Then, in the step E10, B1 lights of the crown C1 (provided with N lights) are lit (B0 remaining lit, as such, all of the lights located between B0 and B0+B1 (included) are lit). B1 is equal to E(A1×N/360) with E(X)=integer portion of X. If B0+B1 is greater than N, then the crown C1 lights the lights located between B0 and B0+B1−N. If B0+B1 is less than −N, then the crown C1 lights the lights located between B0 and B0+B1+N. As a complement, in the step E11, B2 lights of the crown C2 (provided with P lights) are lit. As such, the crown C2 lights the lights located between the "noon" position to B2, with B2 equal to E((A1×N/360−E(A1×N/360))×P) and E(X)=integer portion of X. Consequently, if A1 is positive (rotation in the clockwise direction), the crown C2 lights the lights from C201 to B2; while if A1 is negative (rotation in the anti-clockwise direction), the crown C2 lights the lights from C216 to B2.

As such, as explained in FIG. 10, the first LED that is lit on the circle C2 depends on the direction of rotation of the jog wheel.

Indeed, the LED C201 of the circle C2 is to the right of the position 12h00 (therefore the LED 1 has an angular offset in the clockwise direction).

The LED C216 of the circle C2 is to the left of the position 12h00 (therefore the LED C216 has an angular offset in the anti-clockwise direction).

If the sign of the angle A1 is negative (rotation in the anti-clockwise direction), then the LED C216 is lit first.

If the sign of the angle A1 is positive (rotation in the clockwise direction), then the LED C201 is lit first.

Figure 11:
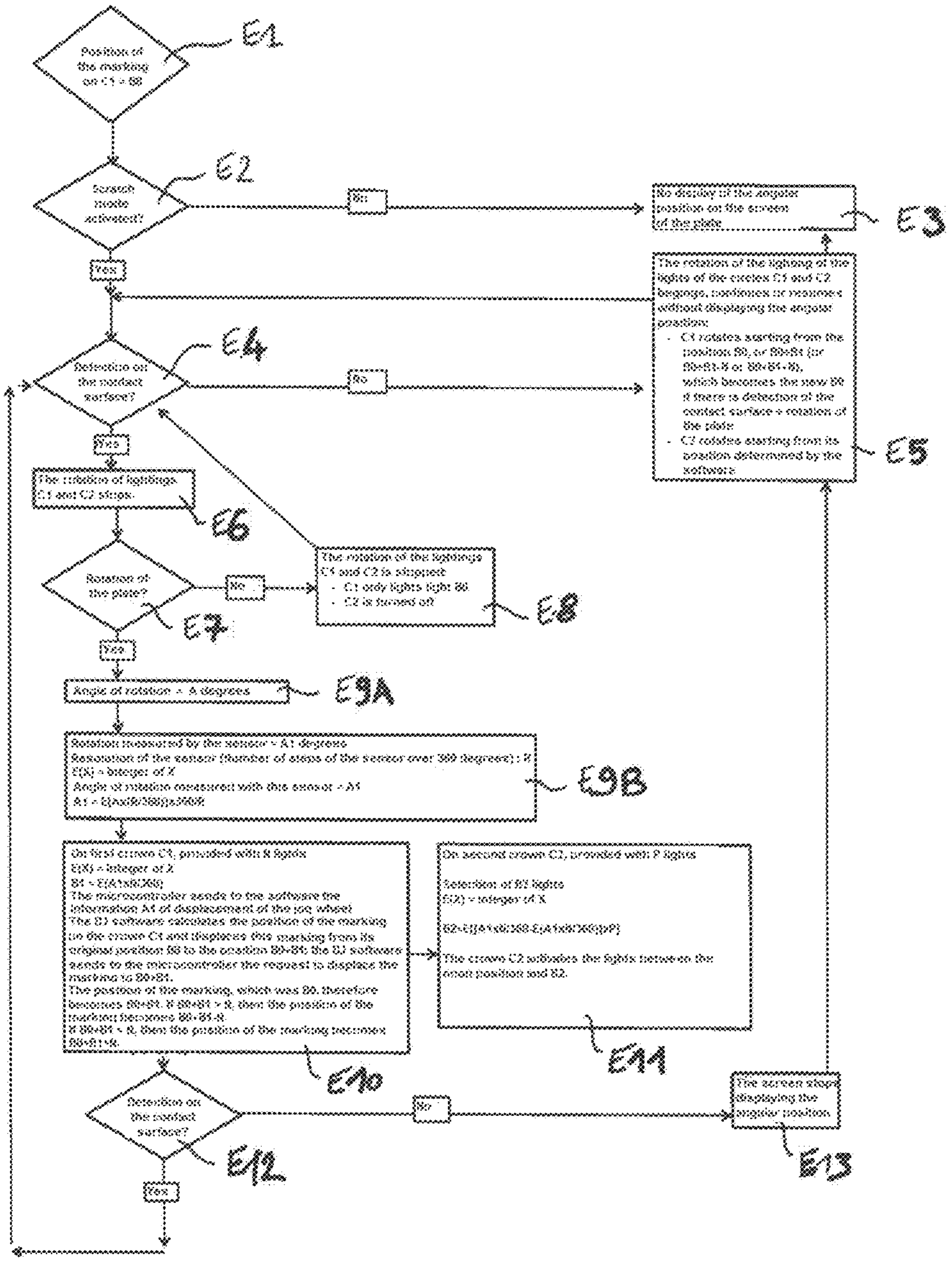
FIG. 11 is a diagram that describes an alternative of the operating mode of the display device implemented in a control device in accordance with the invention.

FIG. 11 is a functional diagram of the lighting of the plate in order to indicate the angular position of the latter on the two crowns of lights C1 and C2.

In this diagram, A is the actual angle of rotation of the plate of the jog wheel at an instant during the scratch.

In this diagram, A1 is the angle of rotation of the plate of the jog wheel obtained thanks to the sensor at an instant during the scratch.

A1=360 degrees maximum during the scratch (beyond this value, the system still functions, see the example 2 hereinbelow). A1 can be positive or negative.

R is the resolution of the sensor (number of steps of the sensor covering 360 degrees).

C1 is a first set of lights arranged in a circle. N is the number of lights of C1. C1 covers 360 degrees.

C2 is a second set of lights arranged in a circle. C2 is a circle inside C1. P is the number of lights of C2. C2 displays the intermediate steps of C1.

The lights of C1, C2 display an approximate representation of the measurement of the actual displacement which depends on the display step (on the precision of their graduation scales) but also on the step of the sensor.

It is considered in the step E1 that the position of the marking on the circle C1 is B0. It is detected in the step E2 if the "scratch" mode is activated. If not, there is no display of the angular position of the plate 22 on the screen 21 (step E3). If yes, a possible pressure on the plate is detected (step E4) in order to determine if the user has started or not his scratch and to determine the position B0 of this scratch action. If no pressure is detected, the playback (see the section of the description concerning the playback mode) of the piece of music begins (if the user has activated the scratch mode before launching the playback mode) or continues (if the user has activated the playback mode before launching the scratch mode) or resumes (if, in scratch mode, the user stops exerting a pressure on the plate), the rotation of the lighting of the circles C1, C2 continues, is initiated or resumes without displaying the angular position of the plate (step E5). C1 rotates starting from the position B0, or from the new position (B0+B1 or B0+B1−N or B0+B1+N) determined by the mixing software, which becomes the new B0 if there is detection (of a press) on the contact surface (on the plate) and a rotation of the plate. C2 rotates starting from the position in the piece of music which is determined by the mixing software. If a pressure is detected, the rotation of the lightings C1 and C2 stops (step E6). It is then detected if there is a rotation of the plate (step E7). If no rotation is detected, only the light B0 of C1 is lit in order to serve as an origin marker (A1=0 as no rotation is detected), the lights of C2 all being turned off (step E8); the user can then easily identify and remember the position B0 (or record it as a "Cue point" if he has not already done so). A possible pressure on the plate is then detected (step E4). When a rotation of the plate is detected, the angle A of rotation of the plate is measured (step E9A) and in the step E9B the angle of rotation equal to A1 degrees is determined. A1 is equal to E(A×(R/360)]×360/R) with E(X)=integer portion of X.

Then, in the step E10, the new position of the marking on the crown C1 is determined. A microcontroller (built into the mixing console) sends to the software the information A1 (angle of displacement of the plate of the "jog wheel"). The DJ software (i.e. the mixing software) calculates the position of the marking on the crown C1 for the purpose of displacing this marking from its position of origin B0 to the position B0+B1 with B1 being equal to E(A1×N/360) and with E(X)=integer portion of X. If B0+B1>N, then the position of the marking becomes B0+B1−N. If B0+B1<−N, then the position of the marking becomes B0+B1+N. The DJ software sends to the microcontroller the request to displace the marking to the new position. As such, on the crown C1, the position of the marking, which was B0, therefore becomes B0+B1 (or B0+B1−N or B0+B1+N).

Example 1

The position B0 of the marking on C1 corresponds to the light C108. The sensor has measured an angle of rotation of +92 degrees of the plate. C1 comprises 32 lights (therefore N=32). The user has chosen the lighting theme referred to as "negative": on C1, the marking of the angle of rotation is represented in the form of a light that is turned off, with the other lights of C1 then being lit (in other words, an unlit cursor will be displaced on a lit circle).

The new position of the marking on C1 is calculated.

$$B1=E(A1\times N/360)$$

$$B1=E(92\times 32/360)$$

$$B1=E(92\times 32/360)$$

$$B1=E(8,177777777777778)$$

$$B1=8$$

$B0+B1$ is not greater than $N$.

$B0+B1$ is not less than $-N$.

The marking must therefore be displaced from its position of origin B0 to the position B0+B1. Consequently, the position of the marking on C1 is displaced by eight lights with respect to B0 (in the clockwise direction because B1 is positive).

Therefore, on C1, the marking of the light C108 is displaced (the light C108 changes state: in this lighting theme, it turns on) to the light C116 (the light C116 changes state: in this theme, it goes out). The state of the other lights of C1 remains unchanged (in this theme, they remain lit).

Example 1 bis

The only difference with respect to the preceding example is that, this time, the user has chosen the lighting them referred to as "positive": on C1, the marking of the angle of rotation is represented in the form of a lit light, with the other lights of C1 then being turned off (in other words, a lit cursor will be displaced on an unlit circle).

$$B1=E(A1\times N/360)$$

$$B1=8$$

Therefore, on C1, the marking of the light C108 is displaced (the light C108 changes state: in this lighting theme, it goes out) to the light C116 (the light C116 changes state: in this theme, it turns on). The state of the other lights of C1 remains unchanged (in this theme, they remain turned off).

Example 2

The position B0 of the marking on C1 corresponds to the light C108. The sensor has measured an angle of rotation of −452 degrees of the plate. C1 comprises 32 lights (therefore N=32). The user has chosen the lighting theme referred to as "negative".

$$B1=E(A1\times N/360)$$

$$B1=E(-452\times 32/360)$$

$$B1=E(-452\times 32/360)$$

$$B1=E(-40.177777777777778)$$

$$B1=-40$$

$B0+B1$ is not greater than $N$.

$B0+B1$ is less than $-N$.

$B0+B1<-N$, then the marking has to be displaced from its position of origin $B0$ to the position $B0+B1+N$.

$$B1+N=-40+32=-8.$$

Consequently, the position of the marking on C1 is displaced by 8 lights with respect to B0 (in the anti-clockwise direction because B1 is negative).

Therefore, on C1, the marking of the light C108 is displaced (the light C108 changes state: in this lighting theme, it turns on) to the light C132 (the light C132 changes state: in this theme, it goes out). The state of the other lights of C1 remains unchanged (in this theme, they remain lit).

Example 3

The position B0 of the marking on C1 corresponds to the light C101. The sensor has measured an angle of rotation of +1 degrees of the plate. C1 comprises 32 lights (therefore N=32). The user has chosen the lighting theme referred to as "negative".

$$B1=E(A1\times N/360)$$

$$B1=E(1\times 32/360)$$

$$B1=E(1\times 32/360)$$

$$B1=E(0.0888888888888)$$

$$B1=0$$

$B0+B1$ is not greater than $N$.

$B0+B1$ is not less than $-N$.

The marking has to be displaced from its position of origin B0 to the position B0+B1. But B1=0, consequently, the position of the marking on C1 is displaced by 0 lights with respect to B0 (the light C101 does not change state: it remains lit).

As a complement, in the step E11, B2 lights of the crown C2 (provided with P lights) are selected. As such, the crown C2 activates (lights, for example) the lights located between the "noon" position and B2 (included), with B2 equal to E((A1×N/360−E(A1×N/360))×P) and E(X)=integer portion of X. Consequently, if A1 is positive (rotation in the clockwise direction), the crown C2 activates the lights of C201 to B2; while if A1 is negative (rotation in the anti-clockwise direction), the crown C2 activates the lights of C216 to B2. As such, on the circle C2 the first LED that changes state depends on the direction of rotation of the jog wheel.

Example 1

The sensor has measured an angle of rotation of +92 degrees of the plate. C1 comprises 32 lights (therefore N=32) and C2 comprises 16 lights (therefore P=16). The user has chosen the lighting them referred to as "positive" for C2.

$$B2=E([[A1\times N/360]-E([A1\times N/360])]\times P)$$

$$B2=E([[92\times 32/360]-E([92\times 32/360])]\times 16)$$

$$B2=E([8,177777777777778-E(8,177777777777778)]\times 16)$$

$$B2=E([8,177777777777778-8]\times 16)$$

$$B2=E([0,177777777777778]\times 16)$$

$$B2=E(2.8444444444444)$$

$$B2=2$$

$B2$ lights must be lit on $C2$.

These two lights are lit between the noon position and B2. B2 is positive therefore two lights are selected on C2 from the noon position in the clockwise direction. The lights C201 and C202 are therefore lit (the other lights of C2 being turned off).

The remainder is ignored, i.e. 0.59375 degrees.

Example 1 Bis

The only difference with respect to the preceding example is that, this time, the user has chosen the lighting theme referred to as "negative" pour C2.

$$B2=2$$

$B2$ lights must remain turned off on $C2$.

These two lights are turned off between the noon position and B2. B2 is positive therefore, on C2, two lights are selected from the noon position in the clockwise direction. The lights C201 and C202 are therefore turned off (with the other lights of C2 being lit).

A possible pressure on the plate (step E12) is then again detected in order to determine if the user has finished or not his scratch (as with a vinyl turntable, the user maintains a pressure on the disc as long as the scratch is not complete). If such a pressure is detected, the step E4 is again implemented. In the opposite case, the screen stops displaying the angular position (step E13), then the step E5 is implemented.

This alternative constitutes a lighting mode that is particularly useful when the DJ carries out a series of successful scratches (the pressing on the jog wheel stopping between each scratch) and wants to return to the beginning of the series of scratches.

Other Aspects and Advantages of the Mixing Controller

Figure 12:
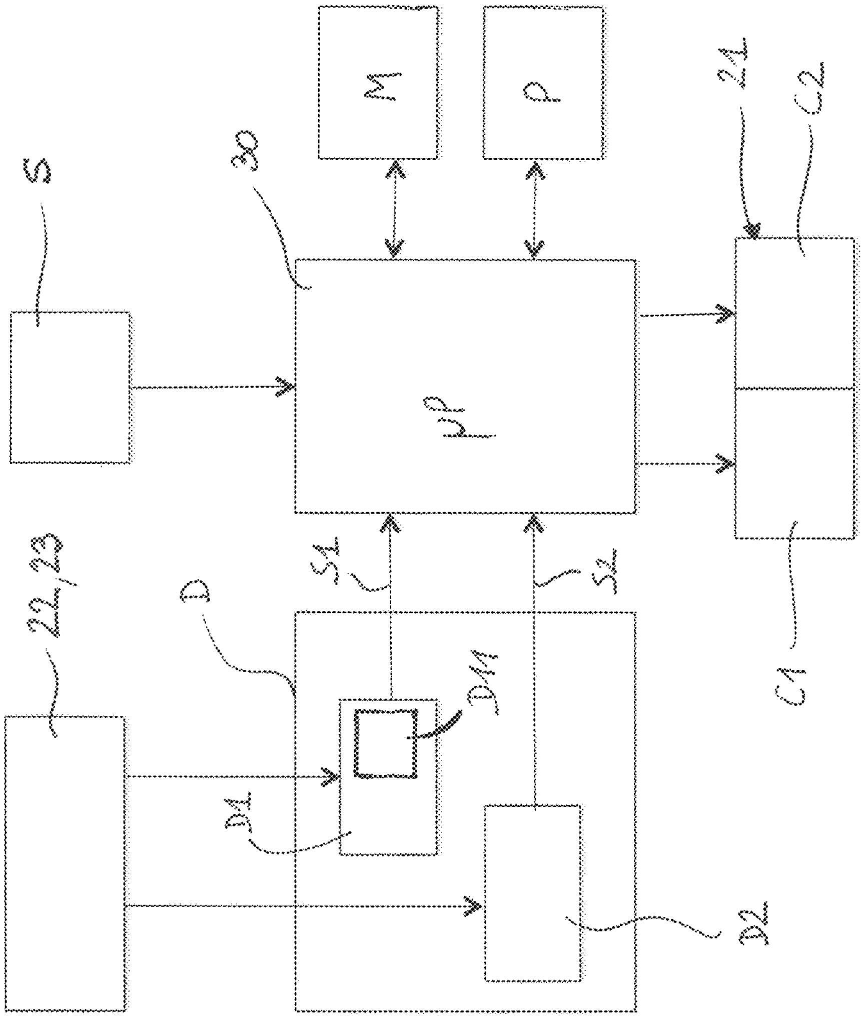
FIG. 12 shows the simplified structure of a control device in accordance with the invention.

FIG. 12 shows the simplified structure of a control device, corresponding to the jog wheel 2, in accordance with the invention implementing a method for controlling at least one audio or video signal according to the particular embodiments described hereinabove.

Such a control device comprises a memory M constituted of a buffer memory, means for processing 30 provided for example with a microprocessor μP, and controlled by the computer program P, implementing the method according to the invention. The memory M, the means for processing 30 and the computer program P can be located on an external device (computer) connected to the control device.

The control device comprises means for detecting D.

The rotation of the means for controlling 22, 23 the jog wheel 2 is detected by first means for detecting D1, comprising means for measuring the angle of rotation D11, able to generate a first signal S1 that supplies means for processing 30 with at least one audio or video signal S.

A press on the means for controlling 22, 23 the jog wheel 2 is detected by second means for detecting D2 able to generate a second signal S2 supplying the means for processing 30 with said at least one audio or video signal S.

Note that the first means for detecting D1 and the second means for detecting D2 can be two separate devices or the same device (a Hall effect sensor, for example, is able to detect both the rotation and a press on the jog wheel 2).

The means for displaying and/or the light-emitting means 21 comprise at least two graduations C1 and C2 formed by sources of light, with these latter being selectively controlled by the means for processing 30 according to the measurement of the angle of rotation of the means for controlling 22, 23 and, possibly, by the detection of a press on the means for controlling 22, 23.

The control device, or mixing controller, 1 offers at least two playback speeds (33 rpm and 45 rpm) of the audio or video tracks.

The mixing controller 1 is provided with an audio interface that plays music up to a resolution of 24-bit/96 kHz, on a double "master" output (where the speakers directed towards the audience are connected) and "booth" output (where the monitoring speakers are connected for the DJ), a headset output for pre-listening, a microphone input for running the evening, a line input in order to inject an external sound source.

The DJ who wants to be further free from the control on a computer screen and interact more easily with the audience can use the mixing controller with his Google Glass (registered trademark) or another similar device. The DJ can as such view on his Google Glass information complementary to that displayed by the mixing controller. For example, the DJ can view on his Google Glass the title of the pieces of music, the name of the artists, the number of votes obtained and the ranking of the title, messages or dedications and customize his animation in real time. He can also thereon preview images, videos or visual effects in order to select them and to run them at the right time. They also allow the DJ to film his service as a subjective view. They finally make it possible to collect the data displayed by the mixing controller (in particular that displayed by the display device of the jog wheels) in order to link them and process them with the other data collected and used by the mixing software.

The mixing controller 1 comprises two sets of four pads, of the drum set type, that allow the DJ to launch sound samples or to move from "cue point" to "cue point" by tapping on the pads. Backlighting with variable colors variables shows the DJ which command is associated with a pad.

The mixing controller 1 further comprises a contactless sensor (infrared, for example), that allows the DJ to control the instantaneous effects by moving his hand away from or closer to the sensor, with such a gesture able to be seen by the audience.

The mixing of the audio and/or of the video is provided by means for processing such as a computer that executes the mixing software. These means for processing can be built into the mixing controller 1.

The sensitivity of the detection of rotation and of the detection of pressure (i.e., the thresholds starting from which the movements detected are taken into account) can be adjusted thanks to a piece of configuration software and/or thanks to a piece of firmware. This makes it possible to determine starting from which angular displacement a scratch starts to be executed.

The signals coming from the sensor or sensors (Hall effect sensor and/or capacitive sensors) are translated into digital output signals and sent directly to a computer (for example, a laptop computer, a tablet, a smartphone, etc.) or another external device for processing data that is executing a mixing software.

In an alternative, the signals coming from the sensor or sensors (Hall effect sensor and/or capacitive sensors) are translated into digital output signals and sent to means for processing built into the mixing controller 1 that processes them in order to provide information or parameters that can be used by a computer or another external device for processing data that is executing a mixing software. The built-in means for processing are able to implement a piece of firmware. Using the information coming from the sensor or sensors, the firmware determines the characteristics of the displacement of the plate with respect to the Hall effect sensor (angular values, speeds, etc.), and therefore with respect to the support of the jog wheel.

The firmware can be updated. The mixing controller 1 can be supplied with a configuration program that makes it possible in particular to update the firmware. For this purpose, the mixing controller 1 comprises at least one erasable and re-programmable non-volatile memory.

In an alternative to the embodiment described hereinabove, the mixing console can implement a single jog wheel according to the invention, or more than two jog wheels.

The invention provides, in at least one embodiment, a device for controlling an audio signal that supplies information in an aesthetic form.

The invention provides, in at least one embodiment, a device for controlling an audio signal that allows for a representation of an angular displacement even minimal of the means for controlling (thanks to a lighting that follows the angular displacement of the means for controlling).

The invention provides, in at least one embodiment, a device for controlling an audio signal that allows for a more precise measurement of the angular displacement of the means for controlling.

The invention provides, in at least one embodiment, a device for controlling an audio signal that facilitates the playback of the angular displacement of the means for controlling.

The invention provides, in at least one embodiment, a device for controlling an audio signal that implements a lighting that allows for the monitoring of the angular displacement of the means for controlling.

The invention provides, in at least one embodiment, a device for controlling an audio signal that allows for an optimum guiding of the user (by retaining on the LEDs or the screen the same angular displacement as that of the plate of the means for controlling).

The invention provides, in at least one embodiment, a device for controlling an audio signal that allows the user to find, easily (and therefore rapidly) and with precision, the position of his choice in a piece of music or video by allowing him to get his bearings on the display of the jog wheel.

The invention provides, in at least one embodiment, a device for controlling an audio signal that implements means for the reliable and precise detecting of a displacement in translation of the control device.

The invention provides, in at least one embodiment, a device for controlling an audio signal that offers a feeling close to that of vinyl turntables.

The invention provides, in at least one embodiment, a device for controlling an audio signal that is robust and reliable, that implements a limited number of parts and that is relatively simple to assemble.

The invention claimed is:

1. A device for controlling at least one audio or video signal comprising:

at least a rotatable part mounted mobile in rotation about an axis of rotation on a base, a first sensor for measuring at least a displacement in rotation of said rotatable part, said first sensor generating a first signal, said first signal being supplied at least to a processor which is supplied with said at least one audio or video signal, said first sensor measuring at least the angle of rotation of the rotatable part about the axis of rotation, first light sources which graduate said angle of rotation of said rotatable part, second light sources which graduate said angle of rotation of said rotatable part, wherein said first light sources and said second light sources respectively form first and second graduations which indicate together substantially the angle of rotation of said rotatable part, wherein the first light sources supply divisions of an approximation of the angle of rotation of the rotatable part according to a first graduation scale, and wherein the second light sources supply divisions of an approximation of the angle of rotation of the rotatable part according to a second graduation scale that is different from the first graduation scale.

2. A device for controlling at least one audio or video signal comprising:

at least a rotatable part mounted mobile in rotation about an axis of rotation on a base, a first sensor for measuring at least a displacement in rotation of said rotatable part, said first sensor generating a first signal, said first signal being supplied at least to a processor, said first sensor measuring at least the angle of rotation of the rotatable part about the axis of rotation, first graduations in relation to said angle of rotation of said rotatable part, second graduations in relation to said angle of rotation of said rotatable part, wherein one or more of said second graduations represent angles which are fractions of an angle represented by each of said first graduations, in such a way that said second graduations represent angles which are intermediate with respect to said first graduations, wherein first light sources form said first graduations and second light sources form said second graduations.

3. The device according to claim 2, wherein the first graduations are arranged in such a way that they substantially form the vertices of a first polygon that can be inscribed in a first circle, and in that said second graduations are arranged in such a way that they substantially form the vertices of a second polygon that can be inscribed in a second circle.

4. The device according to claim 3, wherein said first and second graduations are respectively arranged in at least two circles which are concentric, and in that none of said second graduations is located at a position equivalent to the "noon" position on the dial of a watch with hands.

5. The device according to claim 2, wherein said first graduations and said second graduations indicate together the extent of the displacement in rotation of the rotatable part from the origin (or point of departure) of the displacement to the current position.

6. The device according to claim 2, wherein the number of graduations constituting each one of said first graduations and said second graduations is according to the number of steps per revolution of the rotatable part.

7. The device according to claim 6, wherein the product of the number of the first graduations and of the number of the second graduations is equal to the number of steps per revolution, or to a multiple of the number of steps per revolution, of the rotatable part.

8. The device according to claim 1, wherein a second sensor for detecting a press on the rotatable part, along an axis substantially parallel to the axis of rotation, able to deliver a second signal, said second signal supplying said processor.

9. The device according to claim 1, wherein the first sensor is an optical sensor.

10. The device according to claim 1, wherein the first sensor is a Hall effect sensor.

11. The device according to claim 1, wherein the rotatable part includes a circular plate made from a transparent material and a ring, said first and second graduations being visible through at least one central portion of said plate.

12. The device according to claim 2, wherein said first light sources and said second light sources are mounted fixedly on the base.

13. The device according to claim 2, wherein said light sources consist of at least one LCD screen or VFD screen.

14. The device according to claim 1, wherein said first light sources and said second light sources consist of LEDs.

15. The device according to claim 14, wherein the LEDs are of the monochromatic type or of the RGB type.

16. The device according to claim 2, further comprising third graduations, wherein light sources form said third graduations and are selectively controlled by said processor according to the playback speed of said at least one audio or video signal.

17. The device according to claim 16, further comprising fourth graduations, wherein light sources form said fourth graduations and are selectively controlled by said processor in order to indicate a playback position of said audio or video signal.

18. The device according to claim 2, wherein said second light sources are selectively controlled by said processor to indicate a scratch starting position and a current scratch position.

19. The device according to claim 1, wherein at least said first and second graduations are substantially coaxial with said rotatable part.

20. An electronic mixing controller of at least one audio signal and/or of at least one video signal comprising at least one control device according to claim 2.

21. A method for controlling at least one audio or video signal implemented in an electronic mixing controller according to claim 20, said at least one control device comprising at least a rotatable part mounted mobile in rotation about an axis of rotation on a base, at least several first light sources able to form first graduations, and at least several second light sources able to form second graduations, said method comprising:

a step for detecting a displacement in rotation of the rotatable part by a first sensor able to generate a first signal, said first signal supplying at least a processor which is supplied with said at least one audio or video signal, the first sensor measuring at least the angle of rotation of the rotatable part, a step for displaying said first graduations according to a first scale by activating a first number of said first light sources, said first number being determined by using at least an approximation of said angle of rotation of said rotatable part and the number of all first light sources, and for displaying said second graduations according to a second scale, said second scale being a multiple of said first scale, by activating a second number of said second light sources, said second number being determined by using at least the approximation of the angle of rotation of said rotatable part, the number of all first light sources, and the number of all second light sources.

22. A computer program that can be downloaded from a communications network and/or stored on a support that can be read by a computer and/or executed by a processor, wherein the computer program comprises program code instructions for the execution of the method for controlling at least one audio or video signal according to claim 21, when it is executed on a computer.

23. The device according to claim 2, wherein said first light sources consist of LEDs, and wherein said second light sources consist of LEDs.

24. A device for controlling at least one audio or video signal comprising:

at least a rotatable part mounted mobile in rotation about an axis of rotation (z) on a base, a first sensor for measuring at least a displacement in rotation of said rotatable part, able to generate a first signal, said first signal supplying a processor which is supplied with said at least one audio or video signal, said first sensor measuring at least the angle of rotation of the rotatable part, at least a first set (C1) of lights for visual marking, wherein said first set of lights corresponds to a first level of graduation, and a second set (C2) of lights for visual marking, wherein said second set (C2) corresponds to a second level of graduation which is different from said first level of graduation, and in that said first set and said second set (C1, C2) are selectively controlled by said processor according to the measurement of the angle of rotation of said rotatable part, in such a way that said first set and said second set (C1, C2) display together graduated information.

25. The device according to claim 24, wherein said first set shows at a scale 1/1 the displacement in rotation of said plate, in that the first set (C1) forms a first circle, in that the second set (C2) forms a second circle, and in that the diameter of said first circle is larger than the diameter of said second circle.

* * * * *